United States Patent
Kobayashi et al.

(10) Patent No.: US 10,374,849 B2
(45) Date of Patent: Aug. 6, 2019

(54) SIGNAL PROCESSING APPARATUS AND METHOD

(71) Applicant: Sony Corporation, Tokyo (JP)

(72) Inventors: Seiji Kobayashi, Kanagawa (JP); Toshiyuki Hiroi, Tokyo (JP); Katsuyuki Tanaka, Kanagawa (JP); Tamotsu Ikeda, Tokyo (JP); Hitoshi Tomiyama, Kanagawa (JP); Makoto Sato, Kanagawa (JP); Hiroyuki Mita, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/503,892

(22) PCT Filed: Aug. 11, 2015

(86) PCT No.: PCT/JP2015/072724
§ 371 (c)(1),
(2) Date: Feb. 14, 2017

(87) PCT Pub. No.: WO2016/027731
PCT Pub. Date: Feb. 25, 2016

(65) Prior Publication Data
US 2017/0237588 A1 Aug. 17, 2017

(30) Foreign Application Priority Data
Aug. 21, 2014 (JP) .................................. 2014-168206

(51) Int. Cl.
*H04L 27/00* (2006.01)
*H04L 27/12* (2006.01)
(Continued)

(52) U.S. Cl.
CPC ............ *H04L 27/12* (2013.01); *H04L 27/125* (2013.01); *H04L 27/14* (2013.01); *H04L 27/16* (2013.01);
(Continued)

(58) Field of Classification Search
CPC ....... H04L 27/12; H04L 27/152; H04L 27/20; H04L 27/2272
See application file for complete search history.

(56) References Cited

U.S. PATENT DOCUMENTS 4,071,829 A * 1/1978 Davis ...................... H04L 27/14
329/300
6,148,040 A * 11/2000 Nguyen ................ H04L 25/061
375/326
(Continued)

FOREIGN PATENT DOCUMENTS

JP 56-004961 A 1/1981
JP 57-135556 A 8/1982
(Continued)

OTHER PUBLICATIONS

H. C. Park, "Power and bandwidth efficient constant-envelope BPSK signals and its continuous phase modulation interpretation," IEE Proc.-Commun., vol. 152, No. 3, Jun. 2005.
(Continued)

*Primary Examiner* — Janice N Tieu
(74) *Attorney, Agent, or Firm* — Michael Best & Friedrich LLP

(57) ABSTRACT

The present technology relates to a signal processing apparatus and method which can suppress increase in power consumption.
In an aspect of the present technology, control data, which is for controlling frequency modulation to a carrier signal using digital data to be transmitted, and for suppressing a
(Continued)

time average of a fluctuation amount of a frequency modulation amount more than a case of controlling the frequency modulation to the carrier signal using the digital data is generated, the frequency modulation is performed to the carrier signal on the basis of the generated control data, and the carrier signal to which the frequency modulation is performed is transmitted as a transmission signal. The present technology can be applied to, for example, a signal processing apparatus, a transmission apparatus, a reception apparatus, a communication apparatus, or an electronic apparatus having a transmission function, a reception function, or a communication function, or a computer which controls these.

26 Claims, 27 Drawing Sheets

(51) Int. Cl.
    *H04L 27/14* (2006.01)
    *H04L 27/20* (2006.01)
    *H04L 27/16* (2006.01)
    *H04L 27/227* (2006.01)
    *H04L 27/152* (2006.01)

(52) U.S. Cl.
    CPC ............ *H04L 27/20* (2013.01); *H04L 27/152* (2013.01); *H04L 27/227* (2013.01); *H04L 27/2272* (2013.01); *H04L 2027/0018* (2013.01)

(56) References Cited

U.S. PATENT DOCUMENTS

| | | | |
|---|---|---|---|
| 7,072,414 B1* | 7/2006 | Lui | H04L 1/0054 375/274 |
| 7,272,368 B2* | 9/2007 | Devaney | H03D 3/04 455/130 |
| 8,395,458 B1* | 3/2013 | Xie | H03B 5/1243 331/17 |
| 9,350,393 B2* | 5/2016 | Murali | H04B 1/034 |
| 9,516,490 B1* | 12/2016 | Gerdes | H04W 8/005 |
| 2005/0232385 A1* | 10/2005 | Yoshikawa | H03C 3/0925 375/376 |
| 2012/0045009 A1* | 2/2012 | Schleicher | H04B 1/71635 375/268 |
| 2013/0243043 A1* | 9/2013 | Rhee | H04B 1/71632 375/146 |

FOREIGN PATENT DOCUMENTS

| | | |
|---|---|---|
| JP | 03-021126 A | 1/1991 |
| JP | 04-078235 A | 3/1992 |
| JP | 08-508868 A | 9/1996 |
| JP | 2005-287022 A | 10/2005 |

OTHER PUBLICATIONS

Extended European search Report dated Mar. 1, 2018 for corresponding European Application No. 15833492.0.

* cited by examiner

SIGNAL PROCESSING APPARATUS AND METHOD

TECHNICAL FIELD

The present technology relates to a signal processing apparatus and a method, and specifically relates to a signal processing apparatus and a method which can suppress increase in power consumption.

BACKGROUND ART

Conventionally, in a wireless communication to transmit and receive digital data, there has been known a phase modulation method, such as binary phase shift keying (BPSK) modulation or quadrature phase shift keying (QPSK) modulation, as a modulation method. In, for example, Institute of Electrical and Electronic Engineers (IEEE) 802.15.4 which is known as wireless network standards for a relatively short range, the BPSK modulation or the QPSK modulation is used as a modulation system.

Meanwhile, frequency shift keying modulation (hereinafter, also referred to as FSK modulation) is frequently used.

When the phase modulation is compared to the frequency modulation under the same wireless communication path conditions, it is known that the phase modulation (the BPSK modulation or the QPSK modulation) can generally communicate over relatively long distance but has a feature that the envelope of the transmission signal is not constant. As the example illustrated in FIG. 1, the value of the output envelope of the BPSK modulation largely fluctuates together with the modulation data. When the envelope fluctuates in this manner, a final stage amplifier circuit of a transmitter is complicated, and the power consumption can be increased.

Thus, there has been proposed BPSK modulation with a constant envelope (for example, see Non Patent Document 1).

CITATION LIST

Non Patent Document

Non Patent Document 1: H. C. Park, "Power and bandwidth efficient constant-envelope BPSK signals and its continuous phase modulation interpretation", IEE Proc.-Commun., Vol. 152, No. 3, June 2005, pp. 288-294.

SUMMARY OF THE INVENTION

Problems to be Solved by the Invention

However, in the method disclosed in Non Patent Document 1, a phase of a carrier wave is required to be maintained exactly any one of four patterns of values ($\pi/4$, $3\pi/4$, $-3\pi/4$, $-\pi/4$). In order to achieve this, what is called a quadrature modulator (IQ modulator) is needed, but the quadrature modulator is complicated and has poor power efficiency, and the power consumption can be increased.

The present technology is proposed in view of such a situation, and is to suppress increase in power consumption.

Solutions to Problems

An aspect of present technology is a signal processing apparatus including a control data generation unit which generates control data, which is for controlling frequency modulation to a carrier signal using digital data to be transmitted, and for suppressing a time average of a fluctuation amount of a frequency modulation amount more than a case of controlling the frequency modulation to the carrier signal using the digital data, a frequency modulation unit which performs the frequency modulation to the carrier signal on the basis of the control data generated by the control data generation unit, and a transmission unit which transmits, as a transmission signal, the carrier signal to which the frequency modulation is performed by the frequency modulation unit.

The control data generation unit can include an edge detection unit which detects an edge at which a value of the digital data is changed, and an edge data generation unit which generates, as the control data, edge data indicating a position of the edge detected by the edge detection unit at a time interval shorter than a time interval of the edge in the digital data.

The edge detection unit can detect the edge by performing an exclusive OR operation between adjacent bits of the digital data, and the edge data generation unit can generate the edge data by increasing a bit length of a detection result of the edge generated by the edge detection unit.

The edge detection unit can generate 1-bit data indicating a result of the exclusive OR operation between the bits as the detection result of the edge, and the edge data generation unit can convert the 1-bit data generated by the edge detection unit into 10-bit data.

The control data generation unit can further include a data converter which converts the digital data such that a time average of the edge in the digital data is to be constant, and the edge detection unit can detect the edge in the digital data converted by the data converter.

The data converter can convert, on the basis of a predetermined conversion table, the digital data every predetermined bit length.

The data converter can identify, every 3 bits, a value of the 3 bits of the digital data, and convert the 3 bits into 5-bit data in which the number of edges is constant.

The control data generation unit can further include a correction data addition unit which adds correction data to the digital data such that a time average of the number of edges indicated by the edge data is to be constant, and the edge detection unit can detect the edge in the digital data to which the correction data is added by the correction data addition unit.

The correction data can be 1-bit data.

The edge data generation unit can generate the edge data indicating the position of the edge by a pulse, and the control data generation unit can further include a polarity adjustment unit which adjusts a polarity of the pulse in the edge data generated by the edge data generation unit such that a rate of each polarity is to be equal.

The edge data generation unit can generate the edge data indicating the position of the edge by a pulse having a positive polarity, and the polarity adjustment unit can convert, by alternately inverting the polarity of the pulse in the edge data generated by the edge data generation unit, the pulse having the positive polarity into a pulse having a negative polarity.

The frequency modulation unit can perform binary phase shift modulation to a phase of the carrier signal by performing the frequency modulation to the carrier signal on the basis of the control data.

The frequency modulation unit can perform quadrature phase shift modulation to a phase of the carrier signal by performing the frequency modulation to the carrier signal on the basis of the control data.

The frequency modulation unit can perform the frequency modulation to the carrier signal using a fractional PLL in which the frequency modulation is performed by demodulating a division ratio used when an oscillation signal is divided and phase comparison is performed in a PLL.

A Gaussian waveform generation unit which generates a Gaussian waveform according to the control data generated by the control data generation unit can be further included, and the frequency modulation unit can perform the frequency modulation to the carrier signal using the Gaussian waveform generated by the Gaussian waveform generation unit.

An aspect of the present technology is also a signal processing method including generating control data, which is for controlling frequency modulation to a carrier signal using digital data to be transmitted, and for suppressing a time average of a fluctuation amount of a frequency modulation amount more than a case of controlling the frequency modulation to the carrier signal using the digital data, performing the frequency modulation to the carrier signal on the basis of the generated control data, and transmitting, as a transmission signal, the carrier signal to which the frequency modulation is performed.

An another aspect of the present technology is a signal processing apparatus including a reception unit which receives a transmission signal in which frequency modulation is performed to a carrier signal on the basis of control data, which is for controlling the frequency modulation to the carrier signal using digital data to be transmitted, and for suppressing a time average of a fluctuation amount of a frequency modulation amount more than a case of controlling the frequency modulation to the carrier signal using the digital data, an oscillation signal generation unit which corrects a frequency of a reception signal which is the transmission signal received by the reception unit for a shift amount of a carrier frequency of the reception signal due to a phase shift caused by the frequency modulation, and further generates an oscillation signal for converting the frequency of the reception signal into a predetermined intermediate frequency, a frequency converter which converts the frequency of the reception signal into the intermediate frequency using the oscillation signal generated by the oscillation signal generation unit, and a demodulation unit which detects and demodulates a phase of the reception signal converted into the intermediate frequency by the frequency converter.

Another aspect of the present technology is a signal processing method including receiving a transmission signal in which frequency modulation is performed to a carrier signal on the basis of control data, which is for controlling the frequency modulation to the carrier signal using digital data to be transmitted, and for suppressing a time average of a fluctuation amount of a frequency modulation amount more than a case of controlling the frequency modulation to the carrier signal using the digital data, correcting a frequency of a reception signal which is the received transmission signal for a shift amount of a carrier frequency of the reception signal due to a phase shift caused by the frequency modulation, and further generating an oscillation signal for converting the frequency of the reception signal into a predetermined intermediate frequency, converting the frequency of the reception signal into the intermediate frequency using the generated oscillation signal, and detecting and demodulating a phase of the reception signal converted into the intermediate frequency.

Yet another aspect of the present technology is a signal processing apparatus including a frequency modulation unit which performs frequency modulation to a carrier signal using digital data to be transmitted so as to control a phase every predetermined unit time, and a transmission unit which transmits, as a transmission signal, the carrier signal to which the frequency modulation is performed by the frequency modulation unit.

Yet another aspect of the present technology is a signal processing apparatus including a reception unit which receives a transmission signal in which frequency modulation is performed to a carrier signal using digital data to be transmitted so as to control a phase every predetermined unit time, an oscillation signal generation unit which corrects a frequency of a reception signal which is the transmission signal received by the reception unit for a shift amount of a carrier frequency of the reception signal due to a phase shift caused by the frequency modulation, and further generates an oscillation signal for converting the frequency of the reception signal into a predetermined intermediate frequency, a frequency converter which converts the frequency of the reception signal into the intermediate frequency using the oscillation signal generated by the oscillation signal generation unit, and a demodulation unit which detects and demodulates a phase of the reception signal converted into the intermediate frequency by the frequency converter.

In an aspect of the present technology, control data, which is for controlling frequency modulation to a carrier signal using digital data to be transmitted, and for suppressing a time average of a fluctuation amount of a frequency modulation amount more than a case of controlling the frequency modulation to the carrier signal using the digital data is generated, the frequency modulation is performed to the carrier signal on the basis of the generated control data, and the carrier signal to which the frequency modulation is performed is transmitted as a transmission signal.

In another aspect of the present technology, a transmission signal in which frequency modulation is performed to a carrier signal on the basis of control data, which is for controlling the frequency modulation to the carrier signal using digital data to be transmitted, and for suppressing a time average of a fluctuation amount of a frequency modulation amount more than a case of controlling the frequency modulation to the carrier signal using the digital data is received, a frequency of a reception signal which is the received transmission signal is corrected for a shift amount of a carrier frequency of the reception signal due to a phase shift caused by the frequency modulation, and an oscillation signal for converting the frequency of the reception signal into a predetermined intermediate frequency is further generated, the frequency of the reception signal is converted into the intermediate frequency using the generated oscillation signal, and a phase of the reception signal converted into the intermediate frequency is detected and demodulated.

In yet another aspect of the present technology, frequency modulation is performed to a carrier signal using digital data to be transmitted so as to control a phase every predetermined unit time, and the carrier signal to which the frequency modulation is performed is transmitted as a transmission signal.

In yet another aspect of the present technology, a transmission signal in which frequency modulation is performed to a carrier signal using digital data to be transmitted so as to control a phase every predetermined unit time is received, a frequency of a reception signal which is the received transmission signal is corrected for a shift amount of a carrier frequency of the reception signal due to a phase shift caused by the frequency modulation, and an oscillation signal for converting the frequency of the reception signal into a predetermined intermediate frequency is further generated, the frequency of the reception signal is converted into the intermediate frequency using the generated oscillation signal, a frequency of the reception signal is converted into the intermediate frequency using the generated oscillation signal, and a phase of the reception signal converted into the intermediate frequency is detected and demodulated.

Effects of the Invention

According to the present technology, it is possible to process a signal. Furthermore, according to the present technology, it is possible to suppress increase in power consumption.

MODES FOR CARRYING OUT THE INVENTION

Hereinafter, modes for carrying out the present disclosure (hereinafter, referred to as "embodiments") are described. Note that, the description is made in the following order:
1. First embodiment (Transmission apparatus)
2. Second embodiment (Transmission apparatus)
3. Third embodiment (Reception apparatus)
4. Fourth embodiment (Transmission apparatus)
5. Fifth embodiment (Transmission apparatus)
6. Sixth embodiment (Computer)

1. First Embodiment

<BPSK Modulation>

Conventionally, in a wireless communication to transmit and receive digital data, there has been known a phase modulation method, such as BPSK modulation or QPSK modulation, as a modulation method. In, for example, IEEE 802.15.4 known as wireless network standards for a relatively short range, the BPSK modulation or QPSK modulation is used as a modulation system.

Meanwhile, frequency shift keying modulation (hereinafter, also referred to as FSK modulation) is frequently used.

When the phase modulation is compared to the frequency modulation under the same wireless communication path conditions, the phase modulation (the BPSK modulation or the QPSK modulation) can generally communicate over a longer distance than the frequency modulation. Thus, when it is required to communicate over a long distance, the frequency modulation is unsuitable, and it is desirable to use the phase modulation.

Figure 1:
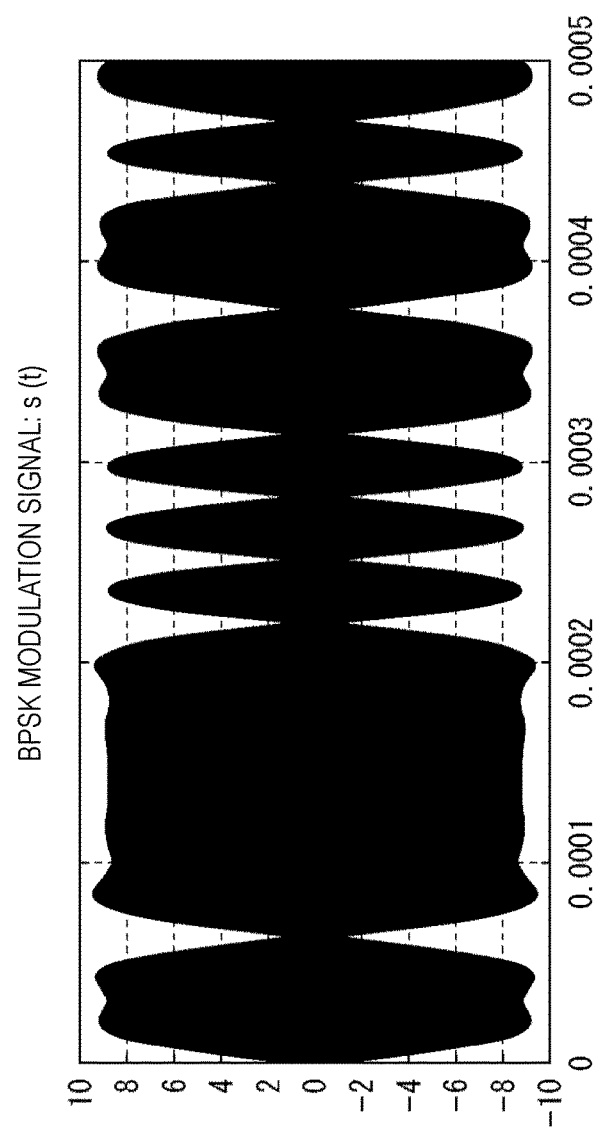
FIG. 1 is a diagram illustrating an example of an output envelope of BPSK modulation.
Figure 2:
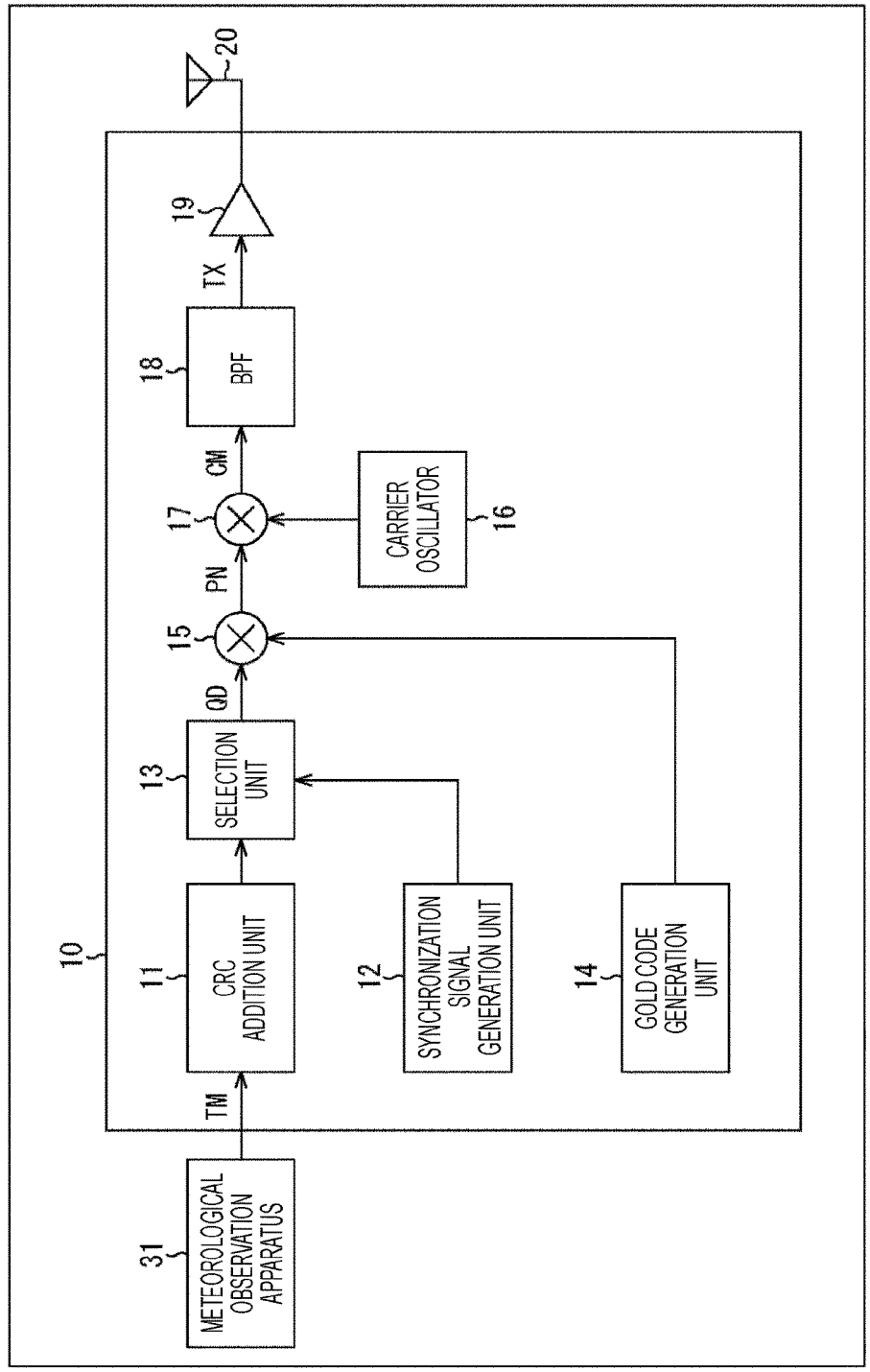
FIG. 2 is a block diagram illustrating a main configuration example of a transmission apparatus.

FIG. 2 illustrates a main configuration example of a transmission apparatus which performs phase modulation as a modulation system of a transmission signal. A transmission apparatus 10 illustrated in FIG. 2 transmits meteorological observation data supplied from a meteorological observation apparatus 31 as a wireless signal.

The meteorological observation apparatus 31 observes meteorological data, such as temperature, sunshine, rainfall, wind directions, or wind speed. The meteorological observation apparatus 31 includes various sensors for observing the meteorological data and a controller for controlling these sensors. The meteorological observation apparatus 31 supplies the observed meteorological data (meteorological observation data) to the transmission apparatus 10.

The meteorological observation apparatus 31 is installed at, for example, a place where it is difficult for a person to observe meteorological data or to access, such as a mountainous area. The transmission apparatus 10 is installed in the vicinity of the meteorological observation apparatus 31.

Furthermore, the meteorological observation data supplied from the meteorological observation apparatus 31 is transmitted to, for example, a city area at the foot of the mountain or the like (in a facility such as a research facility of a university or the like, or a data center). That is, the transmission apparatus 10 is required to transmit a wireless signal over a long distance.

The transmission apparatus 10 includes, as illustrated in FIG. 2, a cyclic redundancy check (CRC) addition unit 11, a synchronization signal (SYNC) generation unit 12, a selection unit 13, a Gold code generation unit 14, a multiplier 15, a carrier oscillator 16, a multiplier 17, a bandpass filter (BPF) 18, an amplifier 19, and an antenna 20, and wirelessly transmits meteorological observation data TM supplied from the meteorological observation apparatus 31.

The transmission apparatus 10 may add a preamble, a Reed-Solomon code, a convolution code, or the like as needed.

Figure 3:
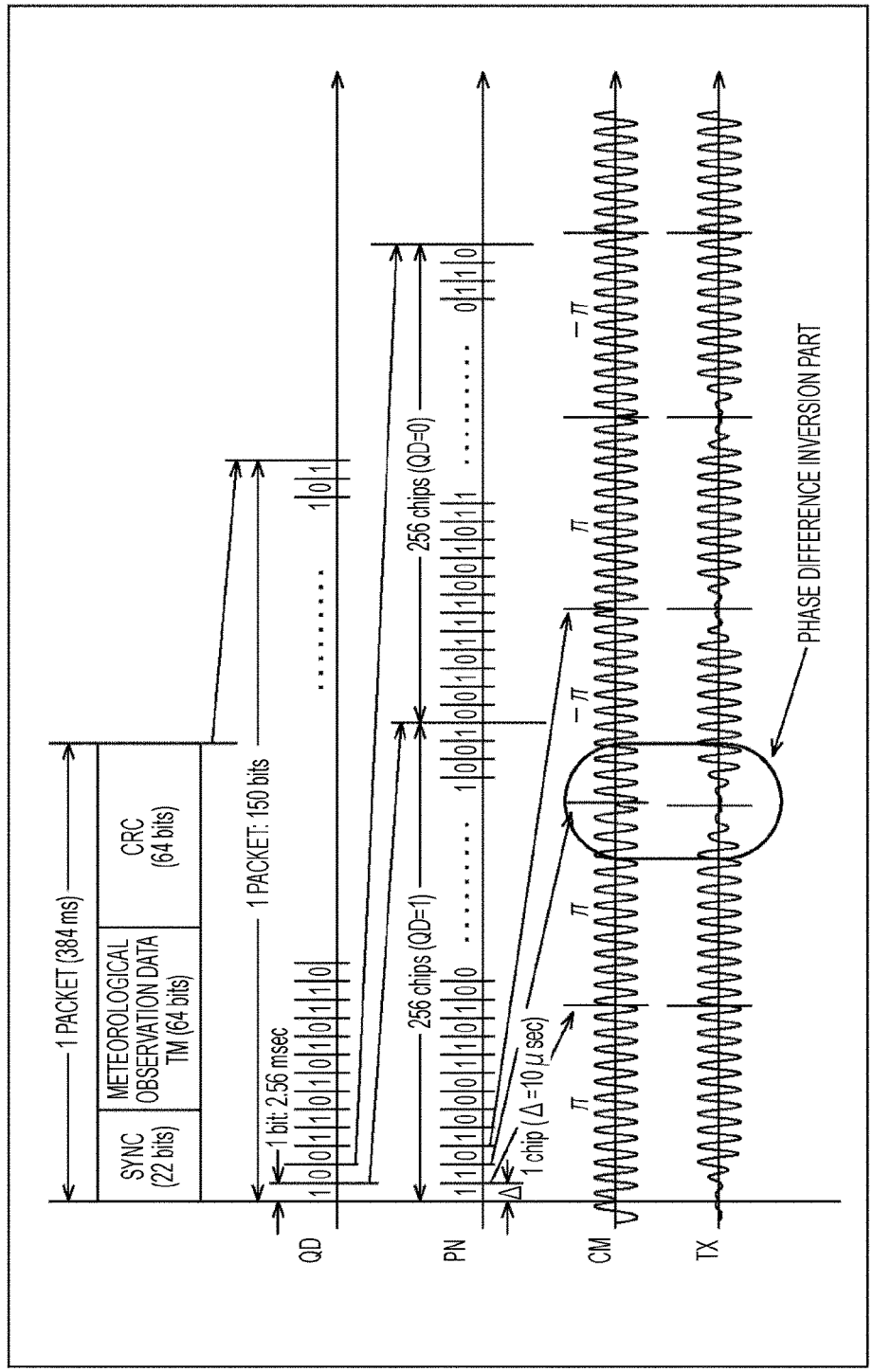
FIG. 3 is a diagram of examples of signals in units.

FIG. 3 is a diagram schematically illustrating a frame format of a transmission packet. As illustrated in the first row from the top of FIG. 3, a transmission packet consists of a 22-bit Sync, 64-bit meteorological observation data TM, and a 64-bit CRC. As illustrated in the second row from the top of FIG. 3, 1-packet of transmission data QD consists of 150 bits. It takes 384 ms in total to wirelessly transmit the 1-packet of transmission data QD.

In FIG. 2, the meteorological observation data TM input to the transmission apparatus 10 is input to the CRC addition unit 11 to add a cyclic redundancy check code (CRC). The selection unit 13 adds a synchronization pattern obtained by the synchronization signal (SYNC) generation unit 12 to the output from the CRC 11. The Gold code generation unit 14 includes two maximum sequence generators, and generates a pseudo-random number sequence having a 256-bit length. The multiplier 15 generates a transmission data sequence PN by multiplying the pseudo-random number sequence with the transmission data QD. As illustrated in the third row from the top of FIG. 3, the transmission data sequence PN is pseudo-random numbers having a 38000-bit length in total (150×256).

The carrier oscillator 16 generates a carrier frequency used to wireless transmission, and supplies it to the multiplier 17. The multiplier 17 modulates the polarity of the carrier frequency according to the transmission data sequence PN, and supplies it to the bandpass filter (BPF) 18 as a modulation signal CM.

In other words, as illustrated in the fourth row from the top of FIG. 3, when the transmission data sequence PN is "1", the phase of the carrier is modulated so as to be $\pi$, and when the transmission data sequence PN is "0", the phase of the carrier is modulated so as to be $-\pi$ (polarity inversion). The modulation signal CM the polarity of which is inverted in this manner is changed sharply at a switching point, and spreads over wide frequency components. If the modulation signal CM is wirelessly transmitted as it is, it can affect the wireless communication in a similar band.

Thus, the bandpass filter 18 restricts the frequency components of the modulation signal CM to the vicinity of the carrier frequency. The BPSK modulation is performed in this manner, and a transmission signal TX the band of which is restricted by the bandpass filter 18 is obtained as illustrated the lowermost row of FIG. 3. The transmission signal TX is amplified by the amplifier 19, radiated from the antenna 20, and thereby transmitted from the transmission apparatus 10 as a wireless signal.

As described above, the meteorological observation apparatus 31 and the transmission apparatus 10 are assumed to be generally installed in a mountainous area or the like. That is, the meteorological observation apparatus 31 and the transmission apparatus 10 are installed at a place where it is difficult to prepare a large-scale external power supply. Thus, these apparatuses need to be driven by a small-scale power supply such as a battery or a photovoltaic generator. That is, these apparatuses are required to be driven with lower power consumption.

However, as illustrated in the lowermost row of FIG. 3, the envelope of the transmission signal TX largely fluctuates due to the band restriction by the bandpass filter 18. The amplifier 19 is required to amplify the envelope as it is. Thus, the amplifier 19 needs amplification with excellent linearity (a class A amplifier circuit or the like), but the circuit configuration is complicated, and the power consumption can be increased.

In contrast, in the case of frequency modulation, an envelope of a transmission signal is constant, and the modulation circuit can be constituted by a switching element. Thus, a radio equipment for the frequency modulation can be implemented more easily and inexpensively than a radio equipment for the phase modulation, and suppress power consumption necessary for transmission. However, as described above, it is difficult for the frequency modulation to communicate over a long distance compared to the phase modulation, and the frequency modulation is unsuitable for the use required to transmit a wireless signal over a long distance like the transmission apparatus 10.

In contrast, Non Patent Document 1 proposes BPSK modulation with a constant envelope. However, in this method, a phase of a carrier wave is required to be maintained exactly any one of four patterns of values ($\pi/4$, $3\pi/4$, $-3\pi/4$, $-\pi/4$). In order to achieve this, what is called a quadrature modulator (IQ modulator) is needed, but the quadrature modulator is complicated and has poor power efficiency, and the power consumption can be increased.

Thus, control data, which is for controlling frequency modulation to a carrier signal using digital data to be transmitted, and for suppressing a time average of a fluctuation amount of a frequency modulation amount more than a case of controlling the frequency modulation to the carrier signal using the digital data is to be generated, the frequency modulation is to be performed to the carrier signal on the basis of the generated control data, and the carrier signal to which the frequency modulation is performed is to be transmitted as a transmission signal.

Consequently, it is possible to achieve the phase modulation with a constant envelope. Thus, it is possible to suppress increase in power consumption during signal transmission by the phase modulation.

Note that, by detecting an edge at which a value of the digital data is changed, edge data indicating a position of the detected edge at a time interval shorter than a time interval of the edge in the digital data may be generated as the control data.

Furthermore, by detecting the edge by performing an exclusive OR operation between adjacent bits of the digital data, and increasing a bit length of a detection result of the generated edge, the edge data may be generated.

At this time, 1-bit data indicating a result of the exclusive OR operation between the bits may be generated as the detection result of the edge, and the generated 1-bit data may be converted into 10-bit data.

Furthermore, by converting the digital data so that a time average of the edge in the digital data is to be constant, the edge in the digital data after the conversion may be detected.

Furthermore, by performing the frequency modulation to the carrier signal on the basis of the control data, binary phase shift modulation may be performed to a phase of the carrier signal.

Furthermore, by performing the frequency modulation to the carrier signal on the basis of the control data, quadrature phase shift modulation may be performed to a phase of the carrier signal.

Furthermore, the frequency modulation may be performed to the carrier signal using a fractional PLL in which the frequency modulation is performed by demodulating a division ratio used when an oscillation signal is divided and phase comparison is performed in a PLL.

A Gaussian waveform is generated according to the generated control data, and the frequency modulation may be performed to the carrier signal using the generated Gaussian waveform.

Furthermore, the frequency modulation is performed to the carrier signal using the digital data to be transmitted so as to control a phase every predetermined unit time, and the carrier signal to which the frequency modulation is performed may be transmitted as a transmission signal.

For example, a signal processing apparatus may include a frequency modulation unit which performs frequency modulation to a carrier signal using digital data to be transmitted so as to control a phase every predetermined unit time, and a transmission unit which transmits, as a transmission signal, the carrier signal to which the frequency modulation is performed by the frequency modulation unit.

Furthermore, for example, a program may cause a computer to function as a frequency modulation unit which performs frequency modulation to a carrier signal using digital data to be transmitted so as to control a phase every predetermined unit time, and a transmission unit which transmits, as a transmission signal, the carrier signal to which the frequency modulation is performed by the frequency modulation unit.

Consequently, it is possible to achieve the phase modulation with a constant envelope. Thus, it is possible to suppress increase in power consumption during signal transmission by the phase modulation.

Note that, binary phase shift modulation may be performed to a phase of the carrier signal by performing the frequency modulation to the carrier signal such that the phase of the carrier signal is to be either of predetermined two phases every unit time.

Furthermore, quadrature phase shift modulation may be performed to a phase of the carrier signal by performing the frequency modulation to the carrier signal such that the phase of the carrier signal is to be either of predetermined four phases every unit time.

Such the frequency modulation may be performed to the carrier signal using in the fractional PLL in which the frequency modulation is performed by modulating a division ratio used when the oscillation signal is divided and phase comparison is performed in the PLL.

Furthermore, the control data for controlling the phase every unit time may be generated using the digital data to be transmitted. Then, on the basis of the generated control data, the frequency modulation may be performed to the carrier signal.

As such control data, a Gaussian waveform capable of including a pulse waveform for controlling the frequency modulation unit every unit time so that the phase of the carrier signal is changed by a predetermined amount may be generated. Then, the frequency modulation may be performed to the carrier signal so that the phase of the carrier signal is to be changed by the predetermined amount according to the pulse waveform part of the generated Gaussian waveform.

Furthermore, an edge at which a value of the digital data is changed is detected, and the Gaussian waveform indicating a position of the detected edge by the pulse waveform may be generated. Then, on the basis of the generated Gaussian waveform, the frequency modulation may be performed to the carrier signal.

Note that, the unit time may be a time interval of each data of the digital data, and the pulse waveform may be a waveform in a shorter time than the unit time.

Furthermore, the edge may be detected by performing an exclusive OR operation between adjacent bits of the digital data.

<Transmission Apparatus>

Figure 4:
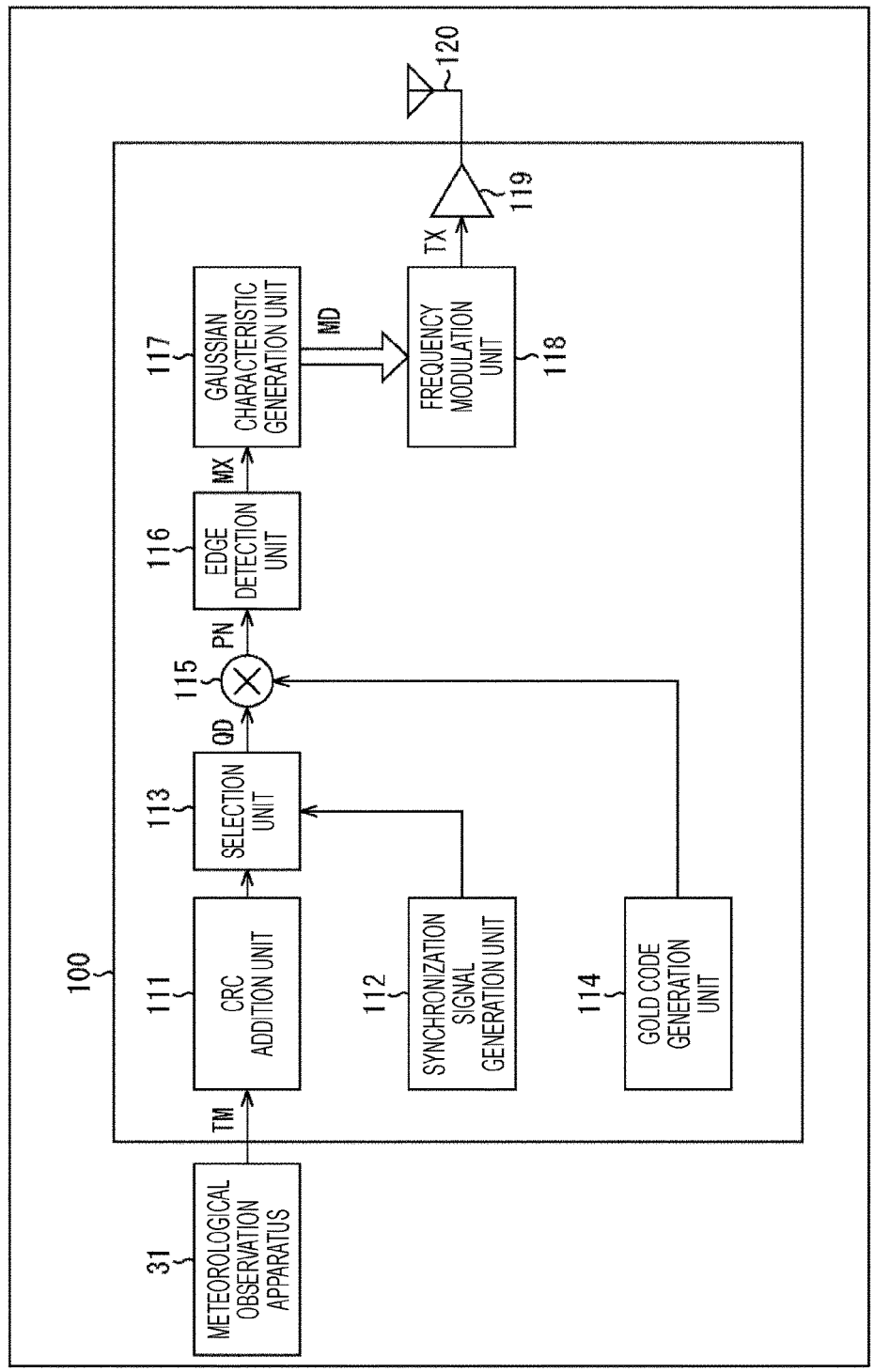
FIG. 4 is a block diagram illustrating a main configuration example of a transmission apparatus.

FIG. 4 illustrates a main configuration example of a transmission apparatus which is an embodiment of a signal processing apparatus to which the above described present technology is applied. A transmission apparatus 100 illustrated in FIG. 4 transmits, similarly to the transmission apparatus 10 in FIG. 2, meteorological observation data supplied from the meteorological observation apparatus 31 (for example, observation data such as temperature, sunshine, rainfall, wind directions, or wind speed) as a wireless signal. The transmission apparatus 100 is installed in, for example, the vicinity of the meteorological observation apparatus 31, and transmits a wireless signal from a mountainous area or the like to a reception apparatus installed in a city area at the foot of the mountain or the like (in a facility such as a research facility of a university or the like, or a data center) (that is, a distant transmission destination).

As illustrated in FIG. 4, the transmission apparatus 100 includes a cyclic redundancy check (CRC) addition unit 111, a synchronization signal (SYNC) generation unit 112, a selection unit 113, a Gold code generation unit 114, a multiplier 115, an edge detection unit 116, a Gaussian characteristic generation unit 117, a frequency modulation unit 118, an amplifier 119, and an antenna 120.

The CRC addition unit 111 adds a cyclic redundancy check code (CRC) for error detection to meteorological observation data TM supplied from the meteorological observation apparatus 31, and supplies it to the selection unit 113. This cyclic redundancy check code can be any code, and the data length is also arbitrary.

The synchronization signal generation unit 112 generates a predetermined synchronization pattern, and supplies it to the selection unit 113. This synchronization pattern can be any pattern, and the data length is also arbitrary.

The selection unit 113 adds the synchronization pattern supplied from the synchronization signal generation unit 112 to the meteorological observation data TM, to which the cyclic redundancy check code is added, supplied from the CRC addition unit 111 by appropriately selecting an input, and generates transmission data QD.

Figure 5:
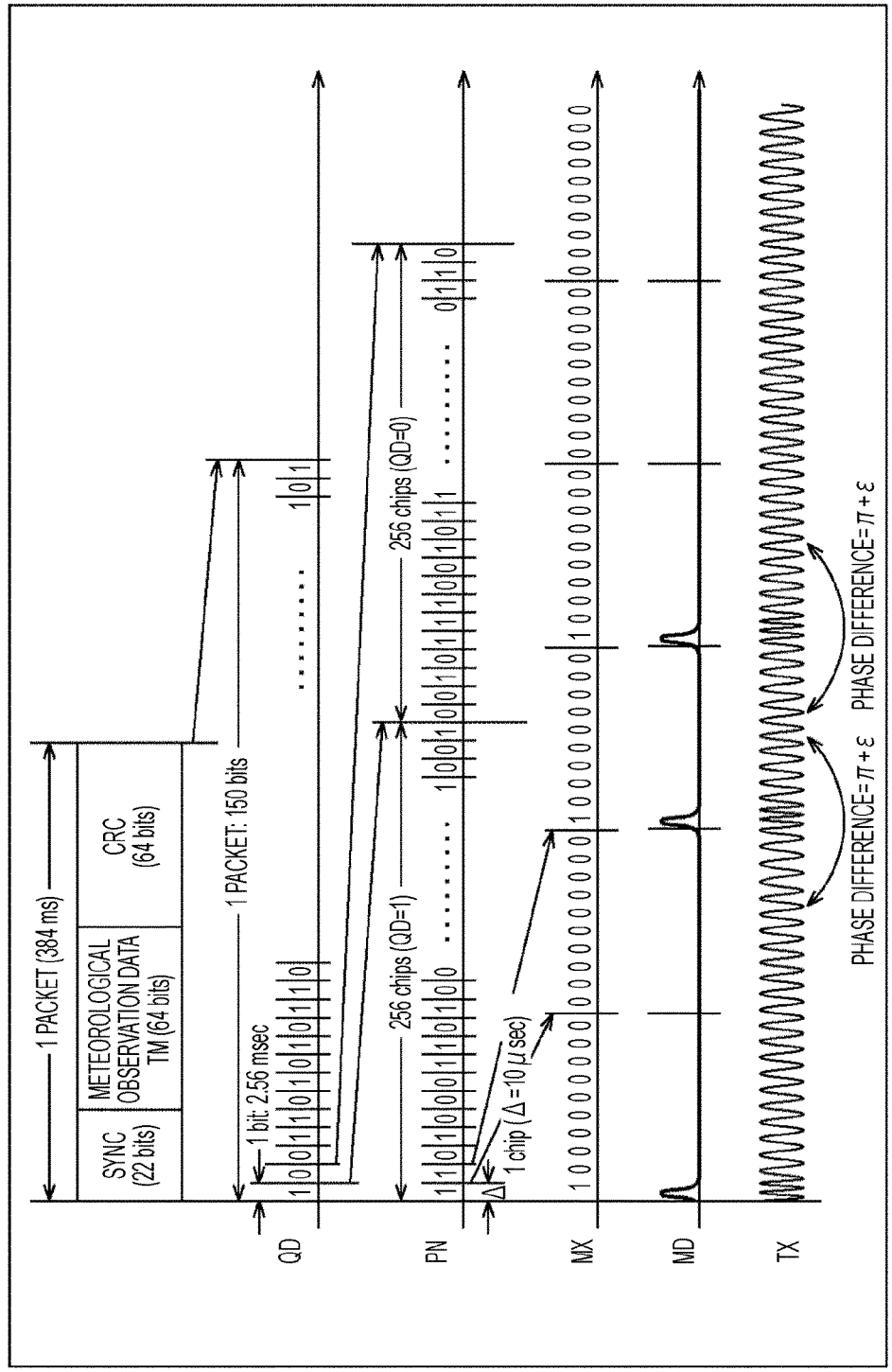
FIG. 5 is a diagram of examples of signals in units.

The meteorological observation data TM to which the cyclic redundancy check code and the synchronization pattern are added every predetermined data length is packetized (a transmission packet). The top row of FIG. 5 illustrates a frame format of a transmission packet (1-packet of transmission data QD). As illustrated in FIG. 5, the transmission packet consists of a 22-bit synchronization pattern (Sync), a 64-bit meteorological observation data TM, and a 64-bit cyclic redundancy check code. That is, the 1-packet of transmission data QD consists of 150 bits as illustrated in the second row from the top of FIG. 5. The time required to transmit 1-bit of transmission data QD is 2.56 ms, and the time required to transmit the 1-packet of transmission data QD is 384 ms (2.56 ms×150 bits).

The selection unit 113 supplies, to the multiplier 115, the transmission data QD, which is the meteorological observation data TM, to which the cyclic redundancy check code and the synchronization pattern are added in this manner.

The Gold code generation unit 114 includes two maximum sequence generators, and generates a pseudo-random number sequence having a 256-bit length (256 chips). For example, the Gold code generation unit 114 generates a predetermined pattern of a bit sequence having a 256-bit length as the pseudo-random number sequence. This pseudo-random number sequence can be any sequence, and the data length is also arbitrary. The Gold code generation unit 114 supplies it to the multiplier 115.

The multiplier 115 generates the transmission data sequence PN by multiplying the transmission data QD supplied from the selection unit 113 with the pseudo-random number sequence supplied from the Gold code generation unit 114. That is, the multiplier 115 assigns the pseudo-random number sequence to each bit of the transmission data QD, and generates a 38000-bit (150 bits×256 bits) pseudo-random number sequence (the transmission data sequence PN) from each transmission packet.

At this time, the value of each bit of the pseudo-random number sequence assigned to the bit at which the value of the transmission data QD is "0" (QD=0) is inverted with respect to the value of each bit of the pseudo-random number sequence assigned to the bit at which the value of the transmission data QD is "1" (QD=1). That is, for example, the multiplier 115 assigns the pseudo-random number sequence to the bit at which the value of the transmission data QD is "0" (QD=0), and assigns the pseudo-random number sequence in which the value of each bit is inverted to the bit at which the value of the transmission data QD is "1" (QD=1). More specifically, for example, the multiplier 115 assigns, as illustrated in the third row from the top of FIG. 5, the pseudo-random number sequence "1101000110100 . . . 1001" to the bit at which the value of the transmission data QD is "1" (QD=1), and the pseudo-random number sequence "0010111001011 . . . 0110" to the bit at which the value of the transmission data QD is "0" (QD=0).

That is, the 256-bit (256 chips) pseudo-random number sequence of the transmission data sequence PN generated in this manner is transmitted for 2.56 ms. Thus, the time required to transmit each bit (1 chip) (of the pseudo-random number sequence) of the transmission data sequence PN is 10 μsec. The multiplier 115 supplies the transmission data sequence PN generated in the above described manner to the edge detection unit 116.

The edge detection unit 116 detects an edge at which the value of the transmission data sequence PN supplied from the multiplier 115 is changed (from 0 to 1, or from 1 to 0), and generates an edge pulse MX indicating the position of the edge, that is, the position at which the value is changed from the previous bit in the transmission data sequence PN.

In the example illustrated in the fourth row from the top of FIG. 5, the edge detection unit 116 assigns a 10-bit identification pattern "1000000000" indicating the edge to the bit at which the value is changed from the previous bit in the transmission data sequence PN, and a 10-bit identification pattern "0000000000" indicating no-edge to the bit at which the value is not changed. In the edge pulse MX in this case, the value "1" indicates the position of the edge in the transmission data sequence PN. Thus, the transmission data sequence PN is changed at an interval of 10 μsec in this case, but the change unit time becomes ⅒ in the edge pulse MX and is a 1-μsec pulse.

The edge detection unit 116 supplies the generated edge pulse MX to the Gaussian characteristic generation unit 117.

The Gaussian characteristic generation unit 117 converts the edge pulse MX supplied from the edge detection unit 116 into a Gaussian waveform MD. As the example illustrated in the fifth row from the top of FIG. 5, in the Gaussian waveform MD, a pulse having a predetermined amplitude is generated at the bit at which the value of the edge pulse MX is "1". That is, the pulse can be generated every predetermined unit time (for example, a time interval of each data of the transmission data sequence PN) (the generation of the pulse is controlled). Furthermore, the pulse is expressed by, for example, a 20-bit bit width. The Gaussian waveform MD is used as control data for controlling the frequency modulation to the carrier signal of the transmission signal. That is, the Gaussian characteristic generation unit 117 can generate the control data for controlling the phase every unit time using the digital data to be transmitted. Especially, the Gaussian characteristic generation unit 117 can generate, as the control data, a Gaussian waveform capable of including a pulse waveform for controlling the frequency modulation unit 118 every unit time so that the phase of the carrier signal is changed by a predetermined amount.

The Gaussian characteristic generation unit 117 supplies the Gaussian waveform MD to the frequency modulation unit 118.

The frequency modulation unit 118 performs the frequency modulation to the carrier signal according to the Gaussian waveform MD supplied from the Gaussian characteristic generation unit 117. For example, the frequency modulation unit 118 performs the frequency modulation to the carrier signal using a fractional PLL in which the frequency modulation is performed by modulating a division ratio used when an oscillation signal is divided and phase comparison is performed in a phase-locked-loop (PLL).

For example, the frequency modulation unit 118 generates the carrier signal having an oscillation frequency according to the Gaussian waveform MD as the transmission signal TX. The lowermost row of FIG. 5 illustrates an example of the transmission signal TX. The frequency of the transmission signal TX is momentarily increased by a pulse part of the Gaussian waveform MD, and the phase of the transmission signal TX is changed by $\pi$. This shift amount depends on a waveform of the pulse part of the Gaussian waveform MD as described later. Here, the waveform of the pulse part of the Gaussian waveform MD is set so that the phase of the transmission signal TX is to be changed by $\pi$. Thus, every time a pulse is generated in the Gaussian waveform MD, that is, every time an edge is generated in the transmission data sequence PN, the phase of the transmission signal TX is changed by $\pi$ (a predetermined amount). That is, the transmission signal TX is modulated similarly to the BPSK modulation.

That is, the frequency modulation unit 118 performs the frequency modulation to the carrier signal using the digital data to be transmitted so as to control the phase every predetermined unit time. The frequency modulation unit 118 supplies the transmission signal TX modulated in this manner to the amplifier 119.

The amplifier 119 amplifies the transmission signal TX supplied from the frequency modulation unit 118. The transmission signal TX amplified by the amplifier 119 is radiated via the antenna 120. In other words, the transmission signal TX is transmitted via the antenna 120 as a wireless signal.

<Edge Detection Unit>

Figure 6:
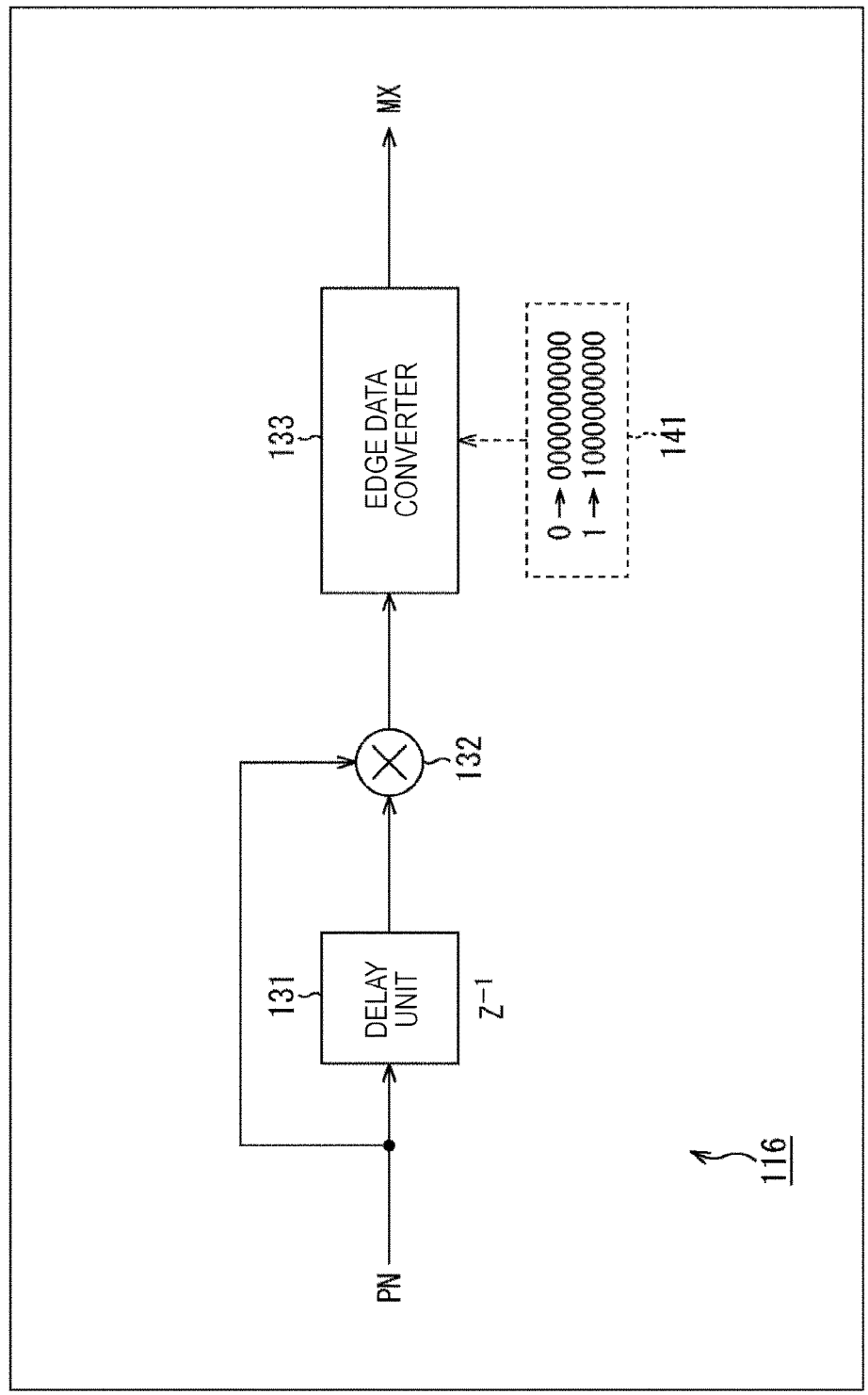
FIG. 6 is a block diagram illustrating a main configuration example of an edge detection unit.

FIG. 6 illustrates a main configuration example of the edge detection unit 116. In the example illustrated in FIG. 6, the edge detection unit 116 includes a delay unit 131, an exclusive OR operation unit 132, and an edge data converter 133.

The delay unit 131 temporarily holds the transmission data sequence PN supplied from the multiplier 115, and then supplies it to the exclusive OR operation unit 132. The configuration of the delay unit 131 is arbitrary. For example, the delay unit 131 may consist of a flip-flop circuit. The transmission data sequence PN is supplied from the multiplier 115, for example, one bit by one bit. The delay unit 131 delays each bit of the transmission data sequence PN by 1 bit by temporarily holding it. For example, when it is assumed that each bit of the transmission data sequence PN is supplied every clock of the synchronization signal, the delay unit 131 holds each bit for a clock of the synchronization signal and then supplies it to the exclusive OR operation unit 132.

The transmission data sequence PN supplied from the multiplier 115 is further supplied to the exclusive OR operation unit 132 without the delay unit 131. The exclusive OR operation unit 132 performs the exclusive OR operation between each bit of the transmission data sequence PN and each bit of the transmission data sequence PN supplied from the delay unit 131 and delayed by 1 bit. That is, the exclusive OR operation unit 132 performs the exclusive OR operation between each bit of the transmission data sequence PN and the previous bit of each bit. That is, a bit which has a different value from the previous bit (that is, an edge) in the transmission data sequence PN is detected.

The exclusive OR operation unit 132 supplies the exclusive OR operation result to the edge data converter 133. In the exclusive OR operation result, the edge is indicated by the value "1".

The edge data converter 133 increases the bit length of the result of the exclusive OR operation supplied from the exclusive OR operation unit 132, and generates edge data (the edge pulse MX) indicating the position of the edge at a time interval shorter than a time interval of the edge in the exclusive OR operation result. In the example of FIG. 5, the edge is indicated at an interval of 10 μsec in the exclusive OR operation result, but is indicated at an interval of 1 μsec in the edge pulse MX. The edge data converter 133 can perform the frequency conversion to the transmission signal TX more steeply by specifying the position of the edge in detail in this manner. Accordingly, it is possible to achieve the phase modulation closer to an original phase modulation like the example of FIG. 3.

The edge data converter 133 supplies the generated edge data (the edge pulse MX) to the Gaussian characteristic generation unit 117.

Note that, the conversion method of the edge data by the edge data converter 133 is arbitrary as long as the conversion is performed similarly to the above description. For example, as illustrated in FIG. 6, the edge data converter 133 may include a predetermined conversion table 141 in advance, and convert, on the basis of the conversion table, the exclusive OR operation result supplied from the exclusive OR operation unit 132.

As illustrated in FIG. 6, the conversion table 141 is to convert the bit of value "0" into a 10-bit bit sequence "0000000000", and the bit of value "1" into a 10-bit bit sequence "1000000000". The edge data converter 133 converts each bit of the exclusive OR operation result according to the conversion table 141. By performing the conversion in this manner, as illustrated in FIG. 5, the 10-bit bit sequence indicates whether each bit of the transmission data sequence PN is the edge. In other words, each bit of the transmission data sequence PN is converted into the 10-bit identification pattern indicating whether the bit is the edge by the edge data converter 133. Then, as described above, since there is only one bit of value "1" in the 10-bit identification pattern indicating the edge, when the value "1" indicates the edge in the edge pulse MX, the position of the edge is to be indicated at a shorter time interval (in this case, 1/10).

Needless to say, the conversion table 141 is arbitrary and is not limited to the example of FIG. 6. For example, the data conversion may be performed every multiple bits. The bit sequence and the bit length after the conversion are arbitrary and are not limited to the above described 10 bits. Furthermore, the conversion table 141 may be supplied from outside the edge data converter 133. Alternatively, the edge data converter 133 may generate the edge pulse MX without using the conversion table 141. For example, the edge data converter 133 may generate the edge pulse MX by performing a predetermined operation.

Note that, in the example of FIG. 5, the edge is expressed by the bit of value "1" in the edge pulse MX, but the expression of the edge is arbitrary. For example, the edge may be expressed by a bit of value "0" or by multiple bits.

<Gaussian Characteristic Generation Unit>

Figure 7:
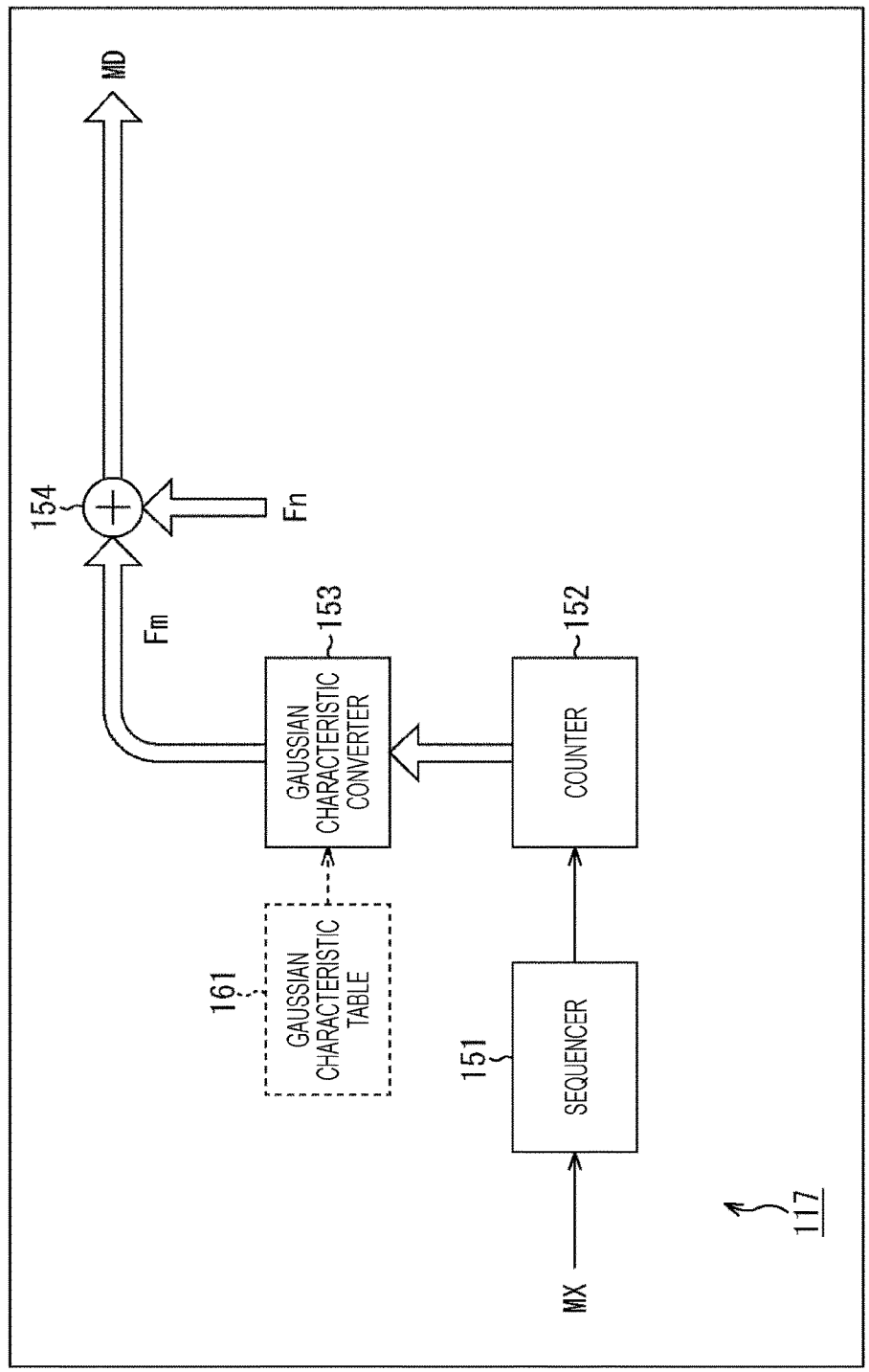
FIG. 7 is a block diagram illustrating a main configuration example of a Gaussian characteristic generation unit.

FIG. 7 illustrates a main configuration example of the Gaussian characteristic generation unit 117. In the example illustrated in FIG. 7, the Gaussian characteristic generation unit 117 includes a sequencer 151, a counter 152, a Gaussian characteristic converter 153, and an addition unit 154.

The sequencer 151 sets an initial value of the counter 152 to zero according to the edge indicated by the edge pulse MX supplied from the edge detection unit 116, and starts count. For example, in the case of FIG. 5, the bit of value "1" in the edge pulse MX indicates the edge. In this case, when the value "1" is input, the sequencer 151 sets the initial value of the counter 152 to zero and starts the count.

The counter 152 outputs a count value according to an elapsed time by counting an unillustrated clock. The count value of the counter 152 is supplied to the Gaussian characteristic converter 153 as an address of a Gaussian characteristic table 161.

The Gaussian characteristic converter 153 includes the Gaussian characteristic table 161 in advance. The Gaussian characteristic table 161 is arbitrary information as long as the information indicates the Gaussian characteristic. For example, the Gaussian characteristic table 161 consists of a predetermined Gaussian characteristic curve.

Figure 8:
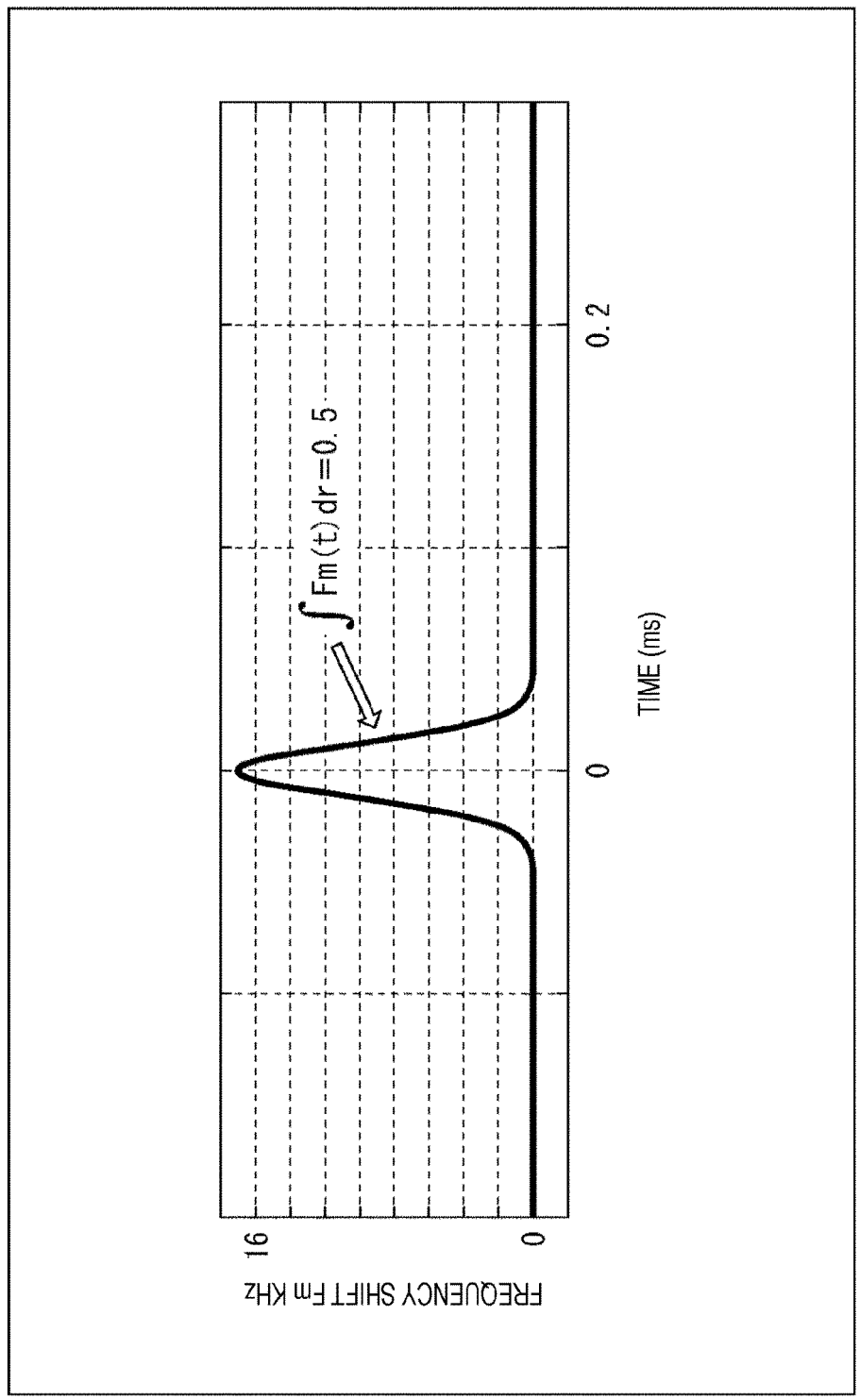
FIG. 8 is a diagram illustrating an example of a Gaussian characteristic.

FIG. 8 illustrates an example thereof. The curve illustrated in FIG. 8 is the Gaussian characteristic curve. Note that, although the abscissa indicates time (ms) in FIG. 8, the count value of the counter 152 is supplied to the Gaussian characteristic converter 153 as the information equivalent to the time. The Gaussian characteristic converter 153 reads, on the basis of the Gaussian characteristic curve of the Gaussian characteristic table 161, a Gaussian characteristic value Fm according to (the time according to) the count value of the counter 152, and supplies it to the addition unit 154.

For example, when the BPSK modulation (the frequency modulation in which the modulation equivalent to the BPSK modulation can be performed) is performed, the amplitude of the Gaussian characteristic curve is adjusted in advance so that the total integrated value of the Gaussian characteristic is to be "0.5". In other words, when the total integrated value of the Gaussian characteristic is "0.5" in the Gaussian characteristic curve of the Gaussian characteristic table 161, the phase shift amount due to the frequency change in the transmission signal TX is to be π.

Note that, the Gaussian characteristic table 161 is arbitrary and is not limited to the example of FIG. 8. Furthermore, the Gaussian characteristic table 161 may be supplied from outside the Gaussian characteristic converter 153.

The addition unit 154 adds the Gaussian characteristic value Fm supplied from the Gaussian characteristic converter 153 to a carrier center frequency setting value Fn, and supplies it to the frequency modulation unit 118 as the Gaussian waveform MD. The Gaussian waveform MD is data in an arbitrary format. For example, the Gaussian waveform MD may be digital data having a 20-bit width.

<Frequency Modulation Unit>

Figure 9:
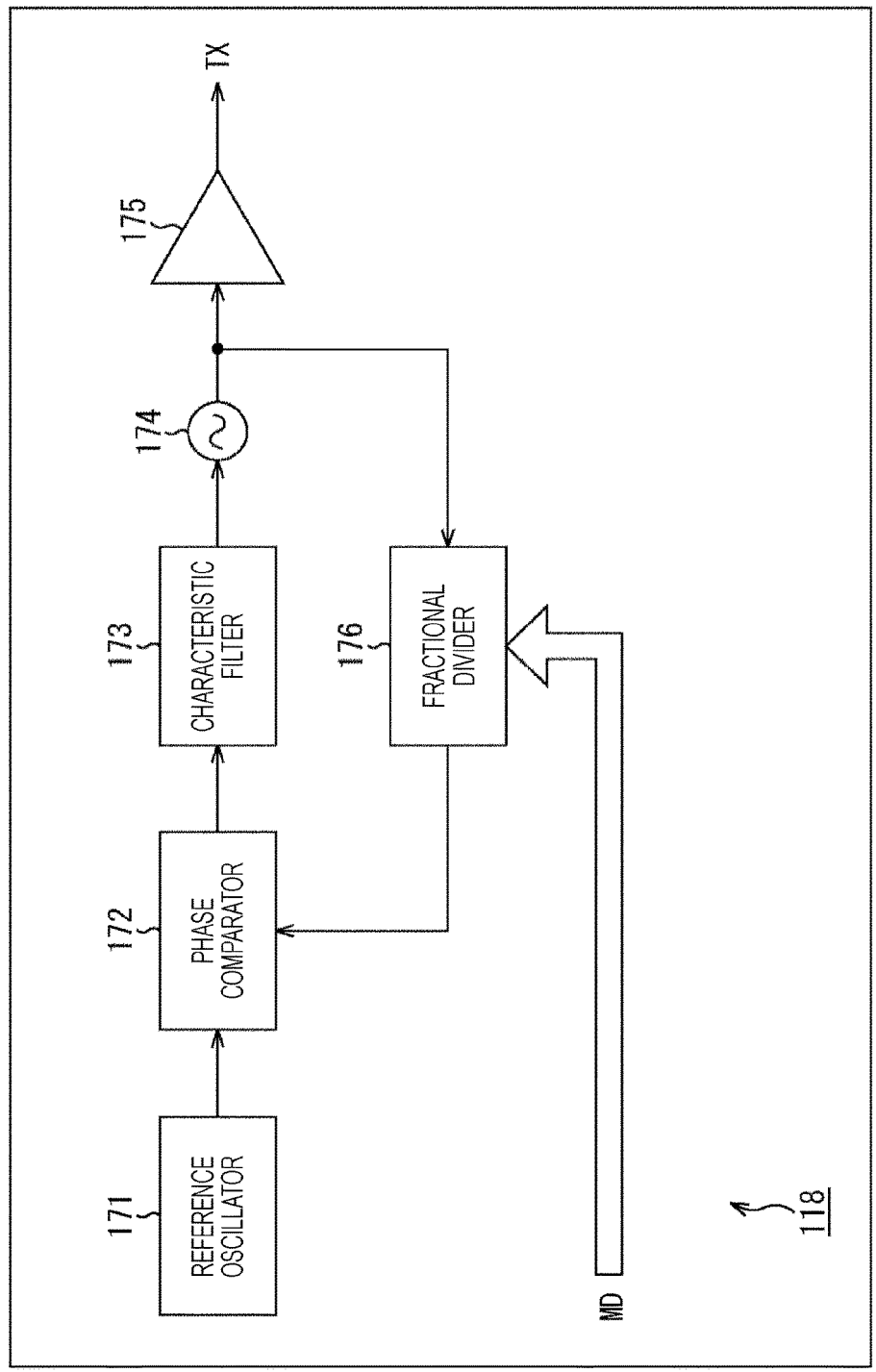
FIG. 9 is a block diagram illustrating a main configuration example of a frequency modulation unit.

FIG. 9 illustrates a main configuration example of the frequency modulation unit 118. In the example illustrated in FIG. 9, the frequency modulation unit 118 includes a reference oscillator (TCXO) 171, a phase comparator 172, a characteristic filter 173, a voltage controlled oscillator (VCO) 174, a buffer amplifier 175, and a fractional divider 176.

The reference oscillator 171 generates a reference frequency which is not affected by change in environmental temperature or the like, and supplies the oscillation signal (the reference frequency signal) to the phase comparator 172.

The phase comparator 172 calculates the phase difference between the reference frequency signal supplied from the reference oscillator 171 and a division signal supplied from the fractional divider 176, and supplies (a phase difference signal indicating) the calculated phase difference to the characteristic filter 173.

The characteristic filter 173 includes, for example, a low pass filter. The characteristic filter 173 eliminates high frequency fluctuation components from the phase difference signal supplied from the phase comparator 172 using the low pass filter. A control filter 173 supplies the phase difference signal from which the high frequency components are eliminated to the VCO 174.

The VCO 174 is a voltage control oscillator. The VCO 174 oscillates at a frequency according to the output of the characteristic filter 173, and supplies the oscillation signal to the buffer amplifier 175 and the fractional divider 176.

The buffer amplifier 175 amplifies the oscillation signal supplied from the VCO 174, and supplies it to the amplifier 119 as the transmission signal TX.

The fractional divider 176 divides the oscillation signal from the VCO 174 and supplies it to the phase comparator 172. At this time, the division ratio of the fractional divider 176 has a ΣΔ type configuration and is set by the Gaussian waveform MD. Here, the Gaussian waveform MD has, for example, 20-bit resolution.

That is, the frequency modulation unit 118 modulates the carrier signal at the oscillation frequency according to the Gaussian waveform MD. Accordingly, as described with reference to FIG. 5, the phase modulation (the binary phase shift modulation) is performed to the transmission signal TX with the shift amount π, and the BPSK modulation is performed equivalently.

That is, the Gaussian waveform MD is changed at the timing when the phase inversion is performed, and the oscillation frequency of the frequency modulation unit 118 (fractional PLL) thereby rises momentarily. When the integrated value of the Gaussian characteristic is matched with "0.5", the phase of the transmission signal TX is to be changed by π. As a result, the phase of the transmission signal TX is equivalent to that to which the BPSK modulation is performed.

As described above, the transmission apparatus 100 can perform the BPSK modulation using the frequency modulation. Thus, the transmission apparatus 100 enables, as illustrated in the lowermost row of FIG. 5, the envelope of the transmission signal TX to be constant, and the amplifier 119 to be implemented by an amplifier circuit having a simpler configuration like a class D amplifier. That is, the transmission apparatus 100 can perform the BPSK modulation with a simpler configuration. Thus, the transmission apparatus 100 can suppress increase in the power consumption of the entire apparatus.

In other words, the transmission apparatus 100 can transmit a wireless signal over a longer distance while suppressing increase in the power consumption of the entire apparatus. Thus, by applying the transmission apparatus 100, it is possible to more easily implement a system which transmits meteorological observation data obtained by the meteorological observation apparatus 31 installed at a place where it is difficult for a person to observe meteorological data, such as a mountainous area, and it is difficult to secure a large-scale external power supply, to, for example, a city area at the foot of the mountain or the like (in a facility such as a research facility of a university or the like, or a data center).

<Transmission Processing Procedure>

Next, various types of processing procedures performed in the above described transmission apparatus 100 are described. First, a transmission processing procedure is described with reference to the flowchart in FIG. 10. When data to be transmitted (for example, meteorological observation data) is input, the transmission apparatus 100 starts transmission processing.

When the transmission processing is started, the CRC addition unit 111 adds the cyclic redundancy check code (CRC) to the data to be transmitted in step S101.

In step S102, the synchronization signal generation unit 112 generates a predetermined synchronization pattern, and the selection unit 113 adds the synchronization pattern to the data to be transmitted and generates the transmission data QD.

In step S103, the Gold code generation unit 114 generates a predetermined pseudo-random number sequence, and the multiplier 115 multiplies the pseudo-random number sequence with (each transmission packet of) the transmission data QD and generates the transmission data sequence PN.

In step S104, the edge detection unit 116 performs edge detection processing, detects a changing part (edge) of the transmission data sequence PN, and generates the edge pulse MX.

In step S105, the Gaussian characteristic generation unit 117 performs Gaussian waveform conversion processing, and converts the edge pulse MX into the Gaussian waveform MD.

In step S106, the frequency modulation unit 118 performs frequency modulation processing, and generates a transmission signal TX having a frequency according to the Gaussian waveform MD.

In step S107, the amplifier 119 amplifies the transmission signal TX, and transmits it via the antenna 120.

<Edge Detection Processing Procedure>

Figure 10:
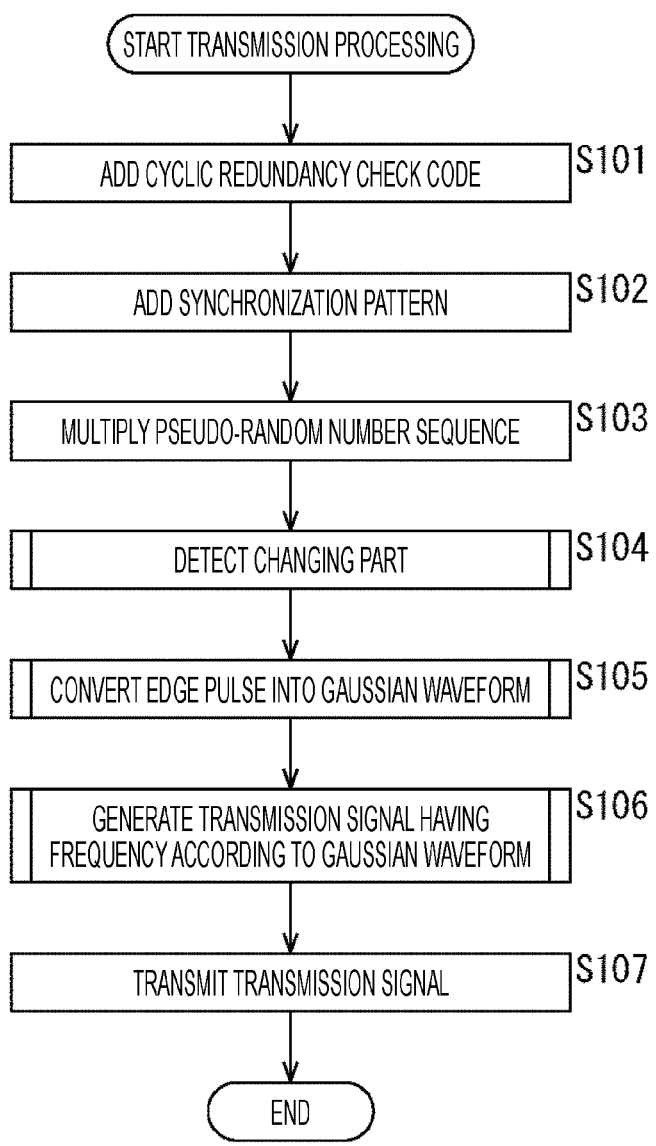
FIG. 10 is a flowchart explaining an example of a transmission processing procedure.

Next, an example of an edge detection processing procedure performed in step S104 of FIG. 10 is described with reference to the flowchart in FIG. 11.

When the edge detection processing is started, the delay unit 131 delays input data to be input every clock (that is, the transmission data sequence PN) by 1 clock in step S121.

In step S122, the exclusive OR operation unit 132 detects the edge in the transmission data sequence PN by performing the exclusive OR operation between the input data before and after the delay.

In step S123, the edge data converter 133 performs data conversion to each bit of the operation result of the exclusive OR operation performed in step S122 using, for example, the conversion table 141 or the like so as to indicate the position of the edge at a time interval shorter than the time interval of the edge in the operation result, and generates the edge pulse MX.

When the processing in step S123 is ended, the processing returns back to FIG. 10.

<Gaussian Waveform Conversion Processing Procedure>

Figure 12:
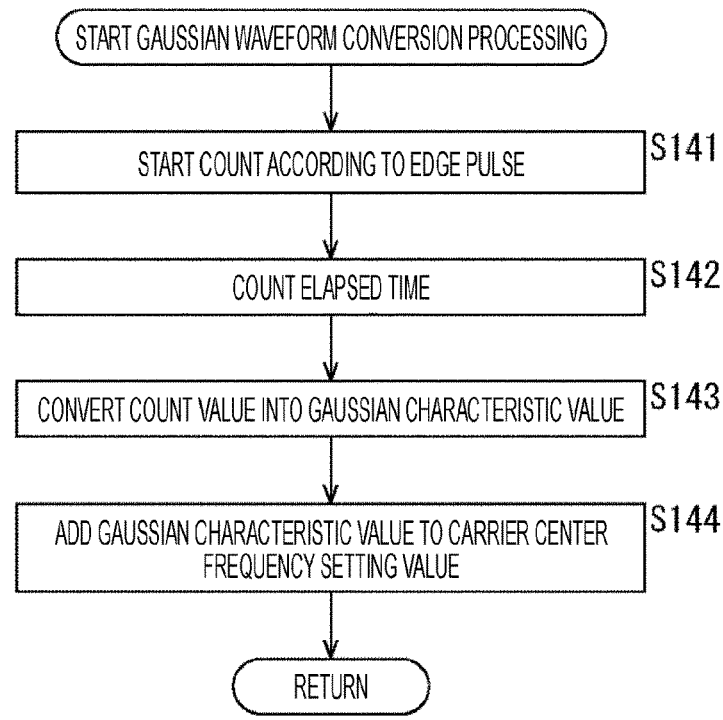
FIG. 12 is a flowchart explaining an example of a Gaussian waveform conversion processing procedure.

Next, with reference to the flowchart in FIG. 12, an example of a Gaussian waveform conversion processing procedure performed in step S105 of FIG. 10 is described.

When the Gaussian waveform conversion processing is started, in step S141, the sequencer 151 resets the count value of the counter 152 according to the edge pulse MX (for example, every time the value indicating the edge appears in the edge pulse MX), and starts the count.

In step S142, the counter 152 starts the count on the basis of the processing in step S141, and counts the elapsed time thereafter.

In step S143, the Gaussian characteristic converter 153 converts the count value obtained in step S152 into the Gaussian characteristic value using the Gaussian characteristic table 161.

In step S144, the addition unit 154 adds the Gaussian characteristic value obtained in step S143 to the carrier center frequency setting value, and generates the Gaussian waveform MD.

When the processing in step S144 is ended, the processing returns back to FIG. 10.

<Frequency Modulation Processing Procedure>

Figure 13:
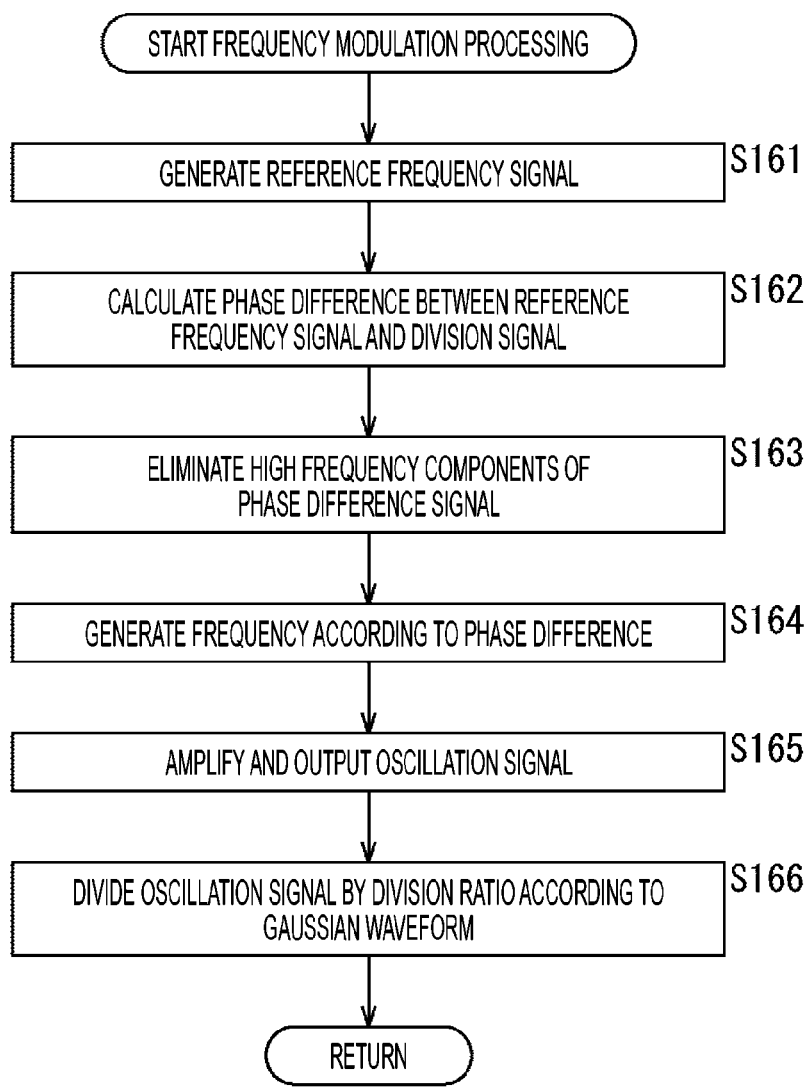
FIG. 13 is a flowchart explaining an example of a frequency modulation processing procedure.

Next, an example of a frequency modulation processing performed in step S106 of FIG. 10 is described with reference to the flowchart in FIG. 13.

When the frequency modulation processing is started, in step S161, the reference oscillator 171 oscillates at a reference frequency, and generates the reference frequency signal.

In step S162, the phase comparator 172 calculates the phase difference between the reference frequency signal and the division signal of the oscillation signal, and generates the phase difference signal.

In step S163, the characteristic filter 173 eliminates unnecessary high frequency components of the phase difference signal obtained in step S162.

In step S164, the VCO 174 oscillates at the frequency according to the phase difference indicated by the phase difference signal from which the high frequency components are eliminated, and generates the oscillation signal having the frequency.

In step S165, the buffer amplifier 175 amplifies the oscillation signal obtained in step S164, and generates the transmission signal TX.

In step S166, the fractional divider 176 divides the oscillation signal obtained in step S164 by the division ratio according to the Gaussian waveform MD obtained in step S105 of FIG. 10. This division signal is used in the processing in step S162.

When the processing in step S166 is ended, the processing returns back to FIG. 10.

The above described processing in each step can be performed in an arbitrary order, in parallel, or repeatedly as needed. Then, each transmission processing is repeatedly performed during the input of the data to be transmitted is continued. That is, other processing accompanying the transmission processing is also repeatedly performed.

By performing each processing in the above described manner, the transmission apparatus 100 can perform the BPSK modulation using the frequency modulation, and transmit a wireless signal over a longer distance while suppressing increase in the power consumption of the entire apparatus.

The transmission signal TX to be transmitted from the above described transmission apparatus 100 can be received and demodulated by a reception apparatus which handles common BPSK modulation.

Note that, although it has been described that the transmission apparatus 100 shifts the phase of the transmission signal TX by $\pi$ by the frequency modulation and thereby performs the BPSK modulation (the binary phase shift modulation) in the above description, the phase shift amount is arbitrary and is not limited to the above. For example, the QPSK modulation (the quadrature phase shift modulation) may be performed. In the case of the QPSK modulation, the phase shift amount is $\pi/2$, and the phase of the carrier wave has four patterns of 0, $\pi/2$, $\pi$, and $3\pi/2$. That is, the transmission apparatus 100 (the frequency modulation unit 118) can perform the binary phase shift modulation to the phase of the carrier signal by performing the frequency modulation to the carrier signal so that the phase of the carrier signal is to be either of predetermined two phases every unit time, or can perform the quadrature phase shift modulation to the phase of the carrier signal by performing the frequency modulation to the carrier signal so that the phase of the carrier signal is to be any one of predetermined four phases every unit time.

The phase shift amount depends on the integrated value of the Gaussian characteristic in the Gaussian waveform MD. For example, by setting the integrated value of the Gaussian characteristic so as to be "0.25" in the Gaussian characteristic table 161 used by the Gaussian characteristic generation unit 117, the phase shift amount of the transmission signal TX in the frequency modulation unit 118 can be $\pi/2$, and it is possible to perform the QPSK modulation.

In this case, the transmission signal TX to be transmitted from the transmission apparatus 100 can be received and demodulated by a reception apparatus which handles common QPSK modulation.

Note that, the data to be transmitted by the transmission apparatus 100 is arbitrary, and is not limited to the above described meteorological observation data. In other words, the transmission apparatus 100 can be applied to an arbitrary system other than the above described system which observes the meteorological data.

Furthermore, although it has been described that the transmission apparatus 100 transmits the transmission signal TX as a wireless signal in the above description, the transmission apparatus 100 may transmit the transmission signal TX via an arbitrary wired communication medium.

2. Second Embodiment

<Control of Number of Edges>

In the case of the method described in the first embodiment, the integrated value of the Gaussian characteristic is set to "0.5" in order to perform the BPSK modulation, but the integrated value needs to be accurately set so that a phase shift amount of a transmission signal TX is to be $\pi$ accurately.

Figure 14:
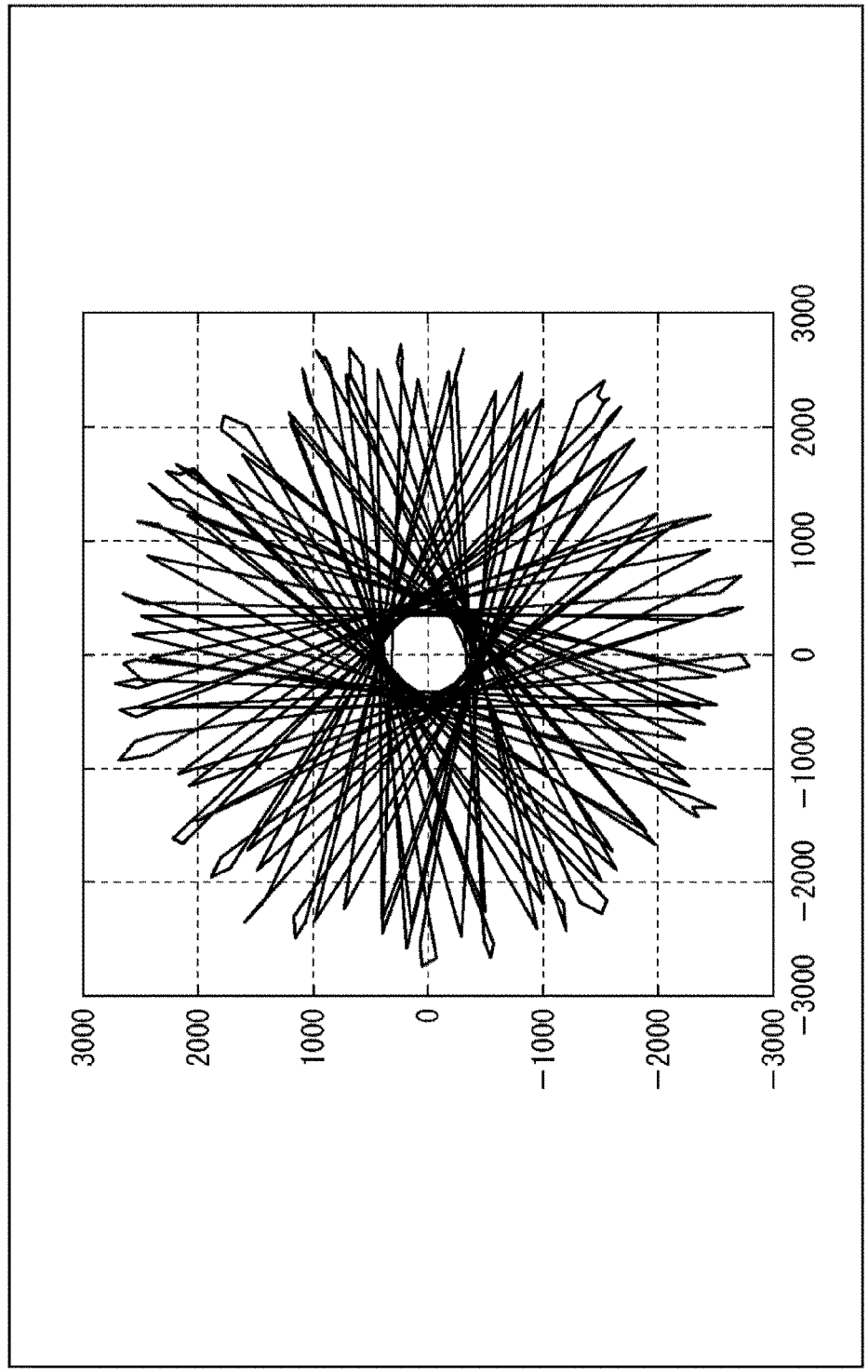
FIG. 14 is a diagram illustrating a demodulation result of data including phase change.

When the phase shift amount of the transmission signal TX is not $\pi$ accurately, that is, when the phase shift amount includes an error ($\varepsilon$), it can be difficult to accurately perform demodulation. For example, the demodulation result of the transmission signal TX when the error $\varepsilon=0.3$ as a constellation is illustrated in FIG. 14.

Since the BPSK modulation is performed, two luminescent spots should appear on the IQ plane in theory. However, if the phase shift amount includes the error (ε), the angle of the luminescent spot is shifted by ε every time the data is inverted as illustrated in FIG. 14. As a result, luminescent spots appear at all angles on a circumference, and it can be difficult to accurately perform the demodulation.

Thus, the integrated value of the Gaussian characteristic needs to be accurately set to "0.5", but the operation speed in an actual fractional PLL is restricted, and it can be difficult to completely accurately follow the Gaussian waveform MD. In this case, the phase shift amount includes the error (ε), and accurate demodulation can be difficult.

Thus, by converting digital data (a transmission data sequence PN) so that a time average of an edge in the digital data is to be constant, the edge in the digital data after the conversion may be detected.

At this time, the digital data may be converted every predetermined bit length on the basis of a predetermined conversion table.

At this time, a value of 3 bits of the digital data may be identified every 3 bits, and the digital data may be converted into 5-bit data in which the number of edges is constant.

If the number of edges per unit time is constant, the number of phase shifts per unit time in the transmission signal TX is to be constant. That is, since the error amount of the phase shift amount per unit time is also to be constant, if the error ε is known, the error ε can be cancelled by shifting the phase by a predetermined amount per unit time.

That is, as described above, by controlling the number of edges in the transmission data sequence PN so that the number of edges per unit time is to be constant, it is possible to demodulate the transmission signal TX more accurately.

<Transmission Apparatus>

Figure 15:
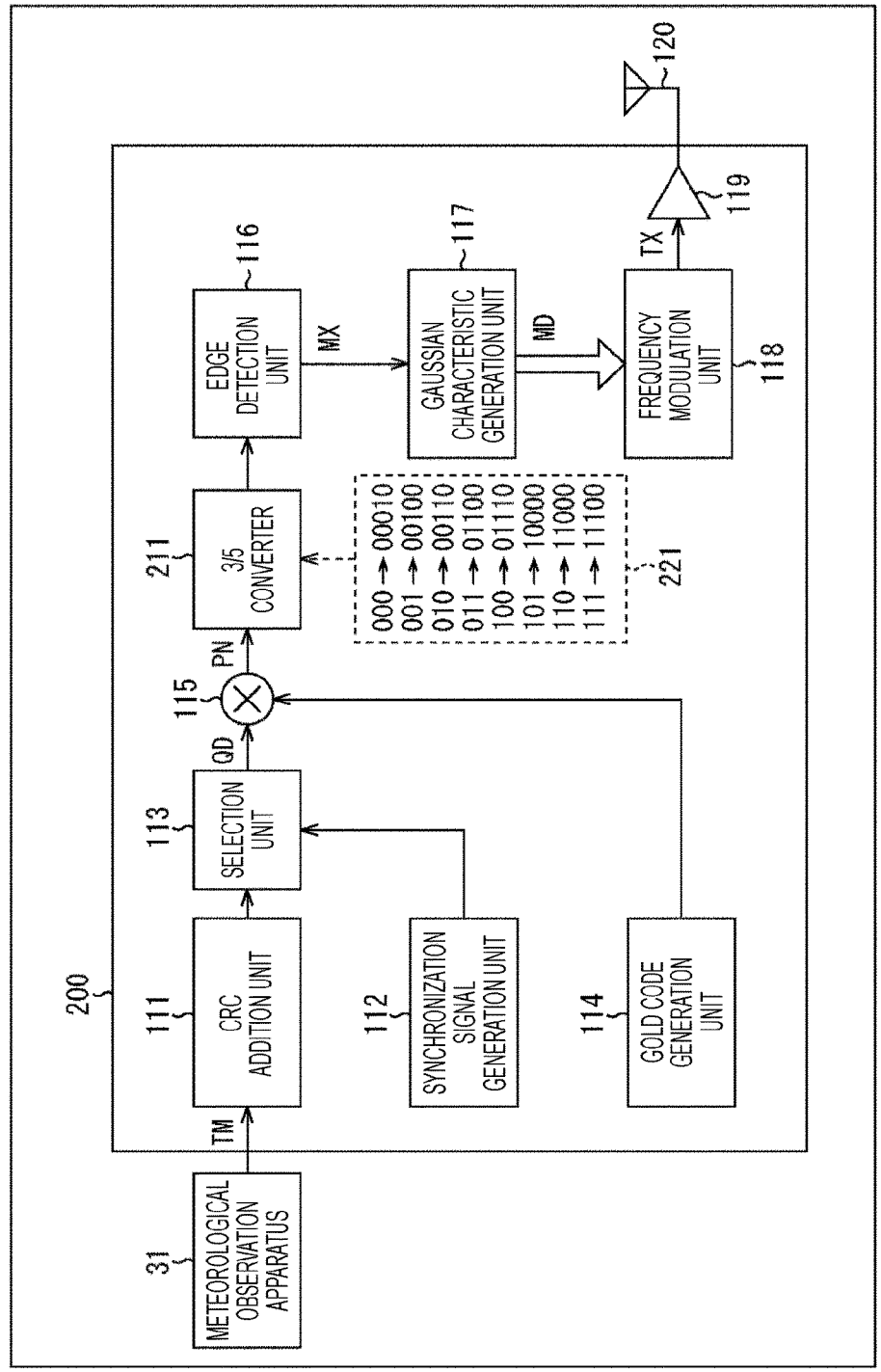
FIG. 15 is a block diagram illustrating a main configuration example of a transmission apparatus.

FIG. 15 illustrates a main configuration example of a transmission apparatus which is an embodiment of a signal processing apparatus to which the above described present technology is applied. A transmission apparatus 200 illustrated in FIG. 15 is similar to the transmission apparatus 100 in FIG. 4, and transmits meteorological observation data supplied from a meteorological observation apparatus 31 (for example, observation data such as temperature, sunshine, rainfall, wind directions, or wind speed) as a wireless signal.

As illustrated in FIG. 15, the transmission apparatus 200 basically has a similar configuration to that of the transmission apparatus 100, but further includes a 3/5 converter 211 in addition to the configuration of the transmission apparatus 100.

The 3/5 converter 211 converts the bit sequence of the transmission data sequence PN so that the time average of the edge in the transmission data sequence PN is to be constant. For example, the 3/5 converter 211 decomposes the transmission data sequence PN in a 3-bit unit, and each 3 bits are converted to 5-bit data in which the number of edges is constant. Note that, the value of the 5-bit data is according to the value of the 3 bits before the conversion. That is, the 3 bits are converted into the 5-bit data having the value capable of identifying the value of the 3 bits before the conversion.

The 3/5 converter 211 includes a conversion table 221 for converting the value of the 3 bits into the 5-bit data in advance, and the above described conversion is performed on the basis of the conversion table 221.

The conversion table 221 is, for example, table information indicating the corresponding relation between 3 bits before the conversion and 5 bits after the conversion like the following example:

000→00010
001→00100
010→00110
011→01100
100→01110
101→10000
110→11000
111→11100

For example, when a 3-bit data sequence to be processed of the transmission data sequence PN is "000", the 3-bit data sequence is converted into the 5-bit data sequence "00010". Similarly, when a 3-bit data sequence is "100", the 3-bit data sequence is converted into the 5-bit data sequence "01110". Similarly, when a 3-bit data sequence is "111", the 3-bit data sequence is converted into the 5-bit data sequence "11100".

That is, a value of each 3-bit data sequence is converted into a 5-bit data sequence having a different value. Thus, at the time of the reception (demodulation), it is possible to return the 5-bit data sequence to the original 3-bit data sequence.

Then, all of 5-bit data sequences after the conversion have the same number of edges. In the example of the above described conversion table 221, the edge is either "0→1" or "1→0" in any 5-bit data sequence (the initial value is "0", and if the first bit value is "1", the edge is counted once). That is, by performing this conversion, the 3/5 converter 211 can make the number of edges per number of unit bits of the transmission data sequence PN (an edge pulse MX) constant. In other words, the 3/5 converter 211 performs the conversion, and the time average of the edge in the transmission data sequence PN (the edge pulse MX) is thereby to be constant.

The 3/5 converter 211 supplies the 5-bit data sequence after the conversion to the edge detection unit 116 as the transmission data sequence PN.

The edge detection unit 116 converts the transmission data sequence PN supplied from the 3/5 converter 211 into the edge pulse MX with a method similar to the case described in the first embodiment.

That is, the 3 bits of the transmission data sequence PN generated by the multiplier 115 are converted into the edge pulse MX as follows:

000→00010→00011
001→00100→00110
010→00110→00101
011→01100→01010
100→01110→01001
101→10000→11000
110→11000→10100
111→11100→10010

As shown above, "1" appears in the edge pulse MX twice per 5 clocks. Thus, the phase change amount due to the error ε is twice per 5 clocks accordingly.

In other words, in the example described above, when it is assumed that the time to transmit the 5-bit edge pulse MX is 5Δ, the phase is shifted by 2ε during this time. This is equivalent to that the carrier frequency is shifted by a frequency Fs determined with the following expression (1):

$$Fs = \varepsilon \div (5\Delta\pi) \qquad (1)$$

Thus, when the transmission signal TX is demodulated, the error ε included in the phase change amount can be cancelled by intentionally shifting the carrier frequency by the frequency Fs. That is, it is possible to demodulate the transmission signal TX more accurately. For example, when it is assumed that ε=0.3, and Δ=10 ρs, the frequency Fs is about 2 KHz.

The transmission apparatus 200 can perform, similarly to the transmission apparatus 100, the BPSK modulation using the frequency modulation, and transmit a wireless signal over a longer distance while suppressing increase in the power consumption of the entire apparatus. Furthermore, the 3/5 converter 211 performs the data conversion to the transmission data sequence PN in the above described manner, and the transmission apparatus 200 can thereby demodulate the transmission signal TX more accurately.

Needless to say, the conversion table 221 is arbitrary and is not limited to the example of FIG. 15. For example, the data conversion may be performed every 2 bits or less, or 4 bits or less. Furthermore, the bit sequence and bit length after the conversion are not limited to the above examples. Furthermore, the conversion table 221 may be supplied from outside the 3/5 converter 211. Alternatively, the 3/5 converter 211 may perform the data conversion without using the conversion table 221.

<Transmission Processing Procedure>

Figure 16:
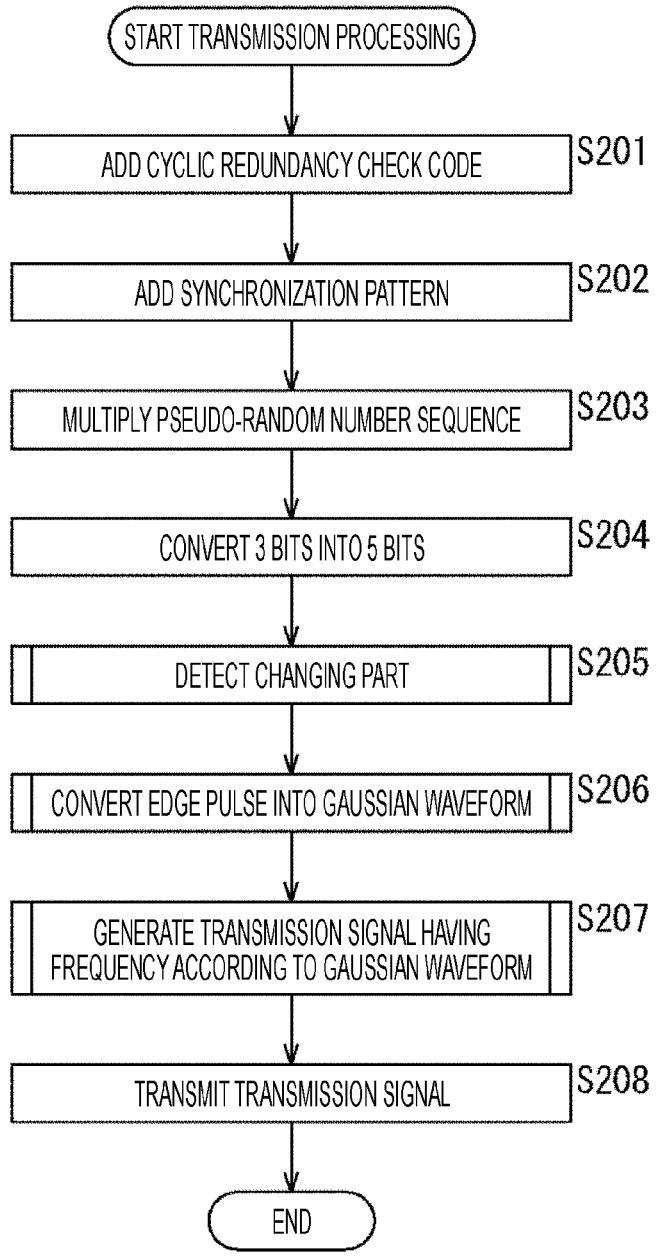
FIG. 16 is a flowchart explaining an example of a transmission processing procedure.

Next, a transmission processing procedure in this case is described with reference to the flowchart in FIG. 16.

In this case, each processing in steps S201 to S203 is performed similarly to each processing in steps S101 to S103 of FIG. 10.

In step S204, the 3/5 converter 211 identifies, every 3 bits, a value of the 3 bits of the transmission data sequence PN, and converts it into a 5-bit data sequence in which the number of edges is constant.

Each processing in steps S205 to S208 is performed to the transmission data sequence PN after the conversion in step S204 similarly to each processing in steps S104 to S107 of FIG. 10.

By performing each processing in the above described manner, the transmission apparatus 200 can perform the modulation equivalent to the BPSK modulation using the frequency modulation, and transmit a wireless signal over a longer distance while suppressing increase in the power consumption of the entire apparatus. Then, the transmission apparatus 200 can demodulate the transmission signal TX more accurately.

Note that, similarly to the transmission apparatus 100, the transmission apparatus 200 may achieve the QPSK modulation (the quadrature phase shift modulation) as well as the BPSK modulation (the binary phase shift modulation).

Furthermore, the data to be transmitted by the transmission apparatus 200 is arbitrary, and is not limited to the above described meteorological observation data. That is, the transmission apparatus 200 can be applied to an arbitrary system other than the above described system which observes the meteorological data.

Furthermore, although it has been described that the transmission apparatus 200 transmits the transmission signal TX as a wireless signal in the above description, the transmission apparatus 200 may transmit the transmission signal TX via an arbitrary wired communication medium.

3. Third Embodiment

<Reception Apparatus>

Figure 17:
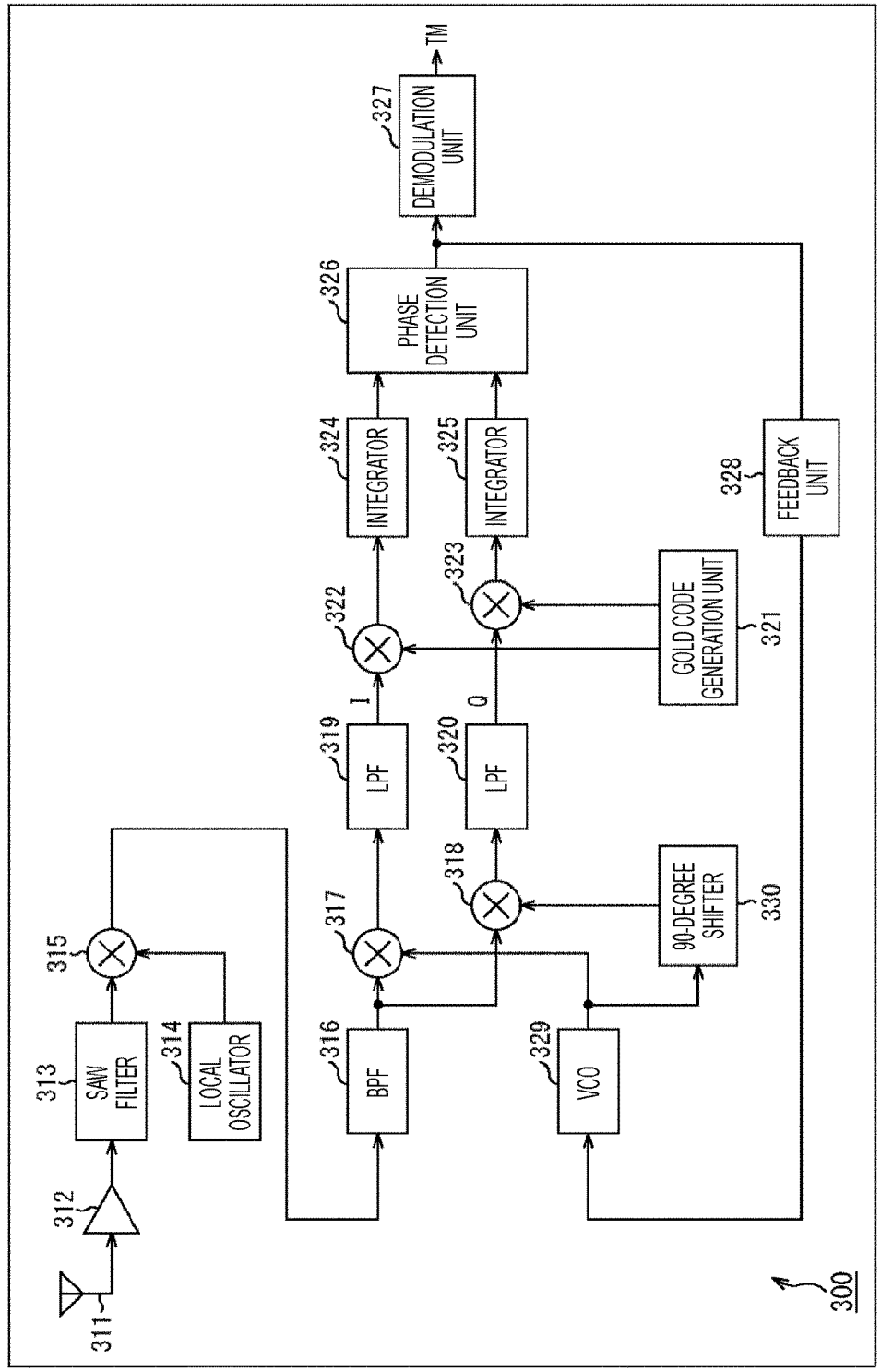
FIG. 17 is a block diagram illustrating a main configuration example of a reception apparatus.

FIG. 17 illustrates a main configuration example of a reception apparatus which is an embodiment of a signal processing apparatus to which the present technology is applied. A reception apparatus 300 illustrated in FIG. 17 receives and demodulates a transmission signal TX transmitted from the transmission apparatus 200 in FIG. 15, and obtains, for example, meteorological observation data or the like (for example, observation data such as temperature, sunshine, rainfall, wind directions, or wind speed). The reception apparatus 300 is installed in, for example, a facility such as a research facility of a university or the like, or a data center in a city area at the foot of the mountain or the like), and receives a wireless signal to be transmitted from the transmission apparatus 200 installed in a mountainous area or the like (that is, a wireless signal transmitted over a long distance).

The modulation equivalent to the BPSK modulation has been performed to the transmission signal TX as described in the second embodiment.

As illustrated in FIG. 17, the reception apparatus 300 includes an antenna 311, a low-noise amplifier 312, a surface acoustic wave (SAW) filter 313, a local oscillator 314, a multiplier 315, a bandpass filter (BPF) 316, a multiplier 317, a multiplier 318, a low pass filter (LPF) 319, a low pass filter (LPF) 320, a Gold code generation unit 321, a multiplier 322, a multiplier 323, an integrator 324, an integrator 325, a phase detection unit 326, a demodulation unit 327, a feedback unit 328, a VCO 329, and a 90-degree shifter 330.

The low-noise amplifier 312 receives a wireless signal (the transmission signal TX) via the antenna 311, amplifies the reception signal, and supplies it to the SAW filter 313.

The SAW filter 313 eliminates components largely different from a desired frequency band from the supplied reception signal, and supplies it to the multiplier 315.

The local oscillator 314 oscillates at a predetermined frequency, and supplies an oscillation signal to the multiplier 315.

The multiplier 315 converts the reception signal into an intermediate frequency signal by multiplying the reception signal supplied from the SAW filter 313 with the oscillation signal supplied from the local oscillator 314. The multiplier 315 supplies the intermediate frequency signal to the bandpass filter 316.

In the case of a common radio receiver, the frequency of the oscillation signal (the oscillation frequency of the local oscillator) LOF is set as the following expression (2):

$$LOF = \text{carrier frequency} - \text{intermediate frequency} \quad (2)$$

For example, when the carrier frequency is 920 MHz and the intermediate frequency is 2 MHz, LOF is set to 918 MHz.

In contrast, in the case of the local oscillator 314, the oscillation frequency LOF is set as the following expression (3) due to a phase shift ε:

$$LOF = \text{carrier frequency} - \text{intermediate frequency} - F_s \quad (3)$$

By shifting the carrier frequency in this manner, the reception apparatus 300 can substantially eliminate the influence of the phase shift (ε).

The bandpass filter 316 passes the components of the intermediate frequency signal. The bandpass filter 316 supplies the filtered intermediate frequency signal to the multiplier 317 and the multiplier 318.

The multiplier 317 multiplies the intermediate frequency signal supplied from the bandpass filter 316 with the oscillation signal supplied from the variable frequency oscillator (VCO) 329, and supplies the multiplication result to the low pass filter 319.

The multiplier 318 multiplies the intermediate frequency signal supplied from the bandpass filter 316 with the oscillation signal, the phase of which is shifted by 90° by the 90-degree shifter 330, generated by the variable frequency oscillator (VCO) 329, and supplied the multiplication result to the low pass filter 320.

The low pass filter 319 eliminates high frequency components of the supplied signal, and generates an InPhase signal (an I signal). The low pass filter 319 supplies the I signal to the multiplier 322.

The low pass filter 320 eliminates high frequency components of the supplied signal, and generates a Quadrature signal (a Q signal). The low pass filter 320 supplies the Q signal to the multiplier 323.

The Gold code generation unit 321 generates a pseudo-random number sequence same as the pseudo-random number sequence generated by the Gold code generation unit 114 of the transmission apparatus 200, and supplies it to the multiplier 322 and the multiplier 323. For example, when the Gold code generation unit 114 operates as the example of FIG. 5, the Gold code generation unit 321 generates a 256-bit (256 chips) pseudo-random number sequence.

The multiplier 322 multiplies the I signal supplied from the low pass filter 319 with the pseudo-random number sequence supplied from the Gold code generation unit 321. The multiplier 322 supplies the multiplication result to the integrator 324.

The multiplier 323 multiplies the Q signal supplied from the low pass filter 320 with the pseudo-random number sequence supplied from the Gold code generation unit 321. The multiplier 323 supplies the multiplication result to the integrator 325.

The integrator 324 performs inverse spread processing by integrating, for 1 bit, the I signal, which is supplied from the multiplier 322, with which the pseudo-random number sequence is multiplied. Accordingly, it is possible to greatly improve the signal to noise ratio (SNR) of the reception signal. The integrator 324 supplies the inversely-spread I signal to the phase detection unit 326.

The integrator 325 performs inverse spread processing by integrating, for 1 bit, the Q signal, which is supplied from the multiplier 323, with which the pseudo-random number sequence is multiplied. Accordingly, it is possible to greatly improve the signal to noise ratio (SNR) of the reception signal. The integrator 325 supplies the inversely-spread Q signal to the phase detection unit 326.

The phase detection unit 326 detects the phase angle with respect to the I signal supplied from the integrator 324 and the Q signal supplied from the integrator 325 (that is, the reception signal). This phase angle should be "+π" or "−π" if the I signal and the Q signal are accurately obtained and do not have noise and errors. The phase detection unit 326 supplies the detection result to the demodulation unit 327 and the feedback unit 328.

The demodulation unit 327 demodulates transmission data QD (in the example of FIG. 5, a 150-bit transmission packet) by determining the polarity of the phase angle in the phase detection result supplied from the phase detection unit 326. Furthermore, the demodulation unit 327 performs error determination by performing a CRC operation. When it is determined that no error occurs, the demodulation unit 327 extracts meteorological observation data TM (in the example of FIG. 5, 64 bits) from the transmission data QD and outputs it.

The feedback unit 328 calculates a phase angle error from the phase angle detection result supplied from the phase detection unit 326, filters the phase angle error, and then supplies it to the VCO 329. That is, the feedback unit 328 controls the oscillation frequency of the VCO 329 so that the phase detection unit 326 can obtain a ±π phase angle.

The VCO 329 oscillates at the frequency according to the control of the feedback unit 328, and supplies the oscillation signal to the multiplier 317 and the 90-degree shifter 330.

The 90-degree shifter 330 shifts the phase of the oscillation signal supplied from the VCO 329 by 90°. The 90-degree shifter 330 supplies the oscillation signal the phase of which is shifted by 90° to the multiplier 318.

As described above, the reception apparatus 300 can receive and accurately demodulate the wireless signal (the transmission signal TX) transmitted from the transmission apparatus 200. That is, the reception apparatus 300 can transmit a wireless signal over a longer distance while suppressing increase in the power consumption of the entire apparatus.

Furthermore, by feeding back the phase detection result of the reception signal and controlling the phase of the reception signal according to the phase angle error as described above, the reception apparatus 300 can reduce the phase angle error of the reception signal. Accordingly, the reception apparatus 300 can demodulate the reception signal (that is, the transmission signal TX) more accurately.

That is, a transmission signal in which frequency modulation is performed to a carrier signal using digital data to be transmitted so as to control a phase every predetermined unit time may be received, a frequency of a reception signal which is the received transmission signal may be corrected for a shift amount of a carrier frequency of the reception signal due to a phase shift caused by the frequency modulation, and an oscillation signal for converting the frequency of the reception signal into a predetermined intermediate frequency may be further generated, the frequency of the reception signal may be converted into the intermediate frequency using the generated oscillation signal, and a phase of the reception signal converted into the intermediate frequency may be detected and demodulated.

For example, a signal processing apparatus may include a reception unit which receives a transmission signal in which frequency modulation is performed to a carrier signal using digital data to be transmitted so as to control a phase every predetermined unit time, an oscillation signal generation unit which corrects a frequency of a reception signal which is the transmission signal received by the reception unit for a shift amount of a carrier frequency of the reception signal due to a phase shift caused by the frequency modulation, and further generates an oscillation signal for converting the frequency of the reception signal into a predetermined intermediate frequency, a frequency converter which converts the frequency of the reception signal into the intermediate frequency using the oscillation signal generated by the oscillation signal generation unit, a frequency converter which converts a frequency of the reception signal into the intermediate frequency using the oscillation signal generated by the oscillation signal generation unit, and a demodulation unit which detects and demodulates a phase of the reception signal converted into the intermediate frequency by the frequency converter.

Furthermore, for example, a program may cause a computer to function as a reception control unit which causes a reception unit to receive a transmission signal in which frequency modulation is performed to a carrier signal using digital data to be transmitted so as to control a phase every predetermined unit time, an oscillation signal generation unit which corrects a frequency of a reception signal which is the transmission signal received under the control of the reception control unit for a shift amount of a carrier frequency of the reception signal due to a phase shift caused by the frequency modulation, and further generates an oscillation signal for converting the frequency of the reception signal into a predetermined intermediate frequency, a frequency converter which converts the frequency of the reception signal into the intermediate frequency using the oscillation signal generated by the oscillation signal generation unit, and a demodulation unit which detects and demodulates a phase of the reception signal converted into the intermediate frequency by the frequency converter.

Consequently, it is possible to receive and accurately demodulate the transmitted wireless signal (the transmission signal TX). That is, it is possible to transmit a wireless signal over a longer distance while suppressing increase in the power consumption of the entire apparatus.

<Reception Processing Procedure>

Figure 18:
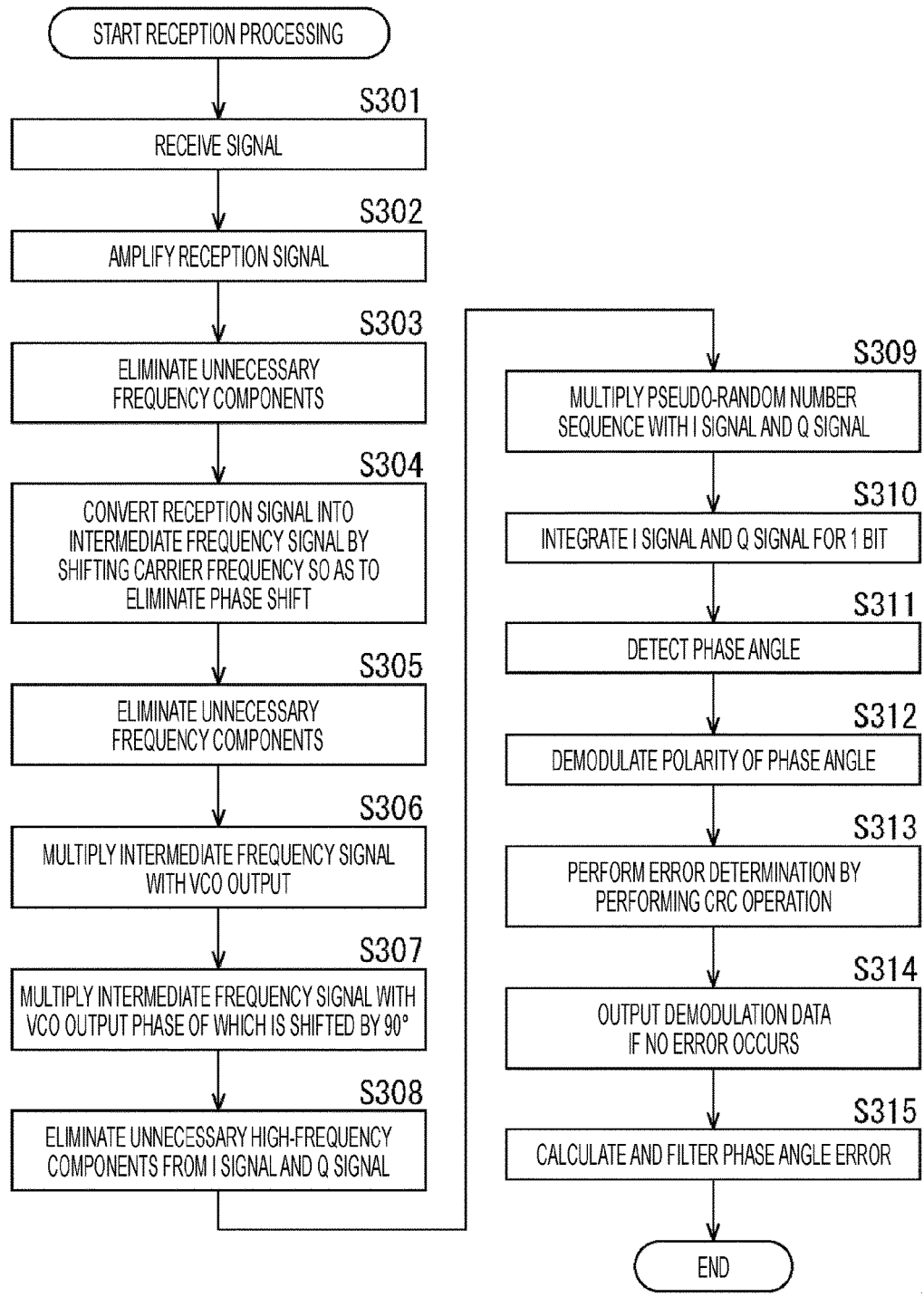
FIG. 18 is a flowchart explaining an example of a reception processing procedure.

Next, an example of a reception processing procedure performed in the above described reception apparatus 300 is described with reference to the flowchart of FIG. 18.

When the reception processing is started, the low-noise amplifier 312 of the reception apparatus 300 receives a wireless signal (the transmission signal TX) via the antenna 311 in step S301.

In step S302, the low-noise amplifier 312 amplifies a reception signal which is the wireless signal received in step S301.

In step S303, the SAW filter 313 eliminates components largely different from a desired frequency band (that is, unnecessary frequency components) from the reception signal amplified in step S302.

In step S304, the local oscillator 314 oscillates at a predetermined frequency, and the multiplier 315 converts the reception signal into the intermediate frequency signal by multiplying the oscillation signal with the reception signal. At this time, the oscillation frequency of the local oscillator 314 is set as the above expression (3). That is, the local oscillator 314 and the multiplier 315 convert the reception signal into the intermediate frequency signal by shifting the carrier frequency so as to eliminate the phase shift of the reception signal.

In step S305, the bandpass filter 316 passes the components of the intermediate frequency signal, and eliminates unnecessary frequency components from the intermediate frequency signal.

In step S306, the multiplier 317 multiplies the intermediate frequency signal with the oscillation signal which is a VCO output.

In step S307, the multiplier 318 multiplies the intermediate frequency signal with the VCO output (the oscillation signal) the phase of which is shifted by 90°.

In step S308, the low pass filter 319 eliminates the high frequency components of the supplied signal, and generates the I signal. Furthermore, the low pass filter 320 eliminates the high frequency components of the supplied signal, and generates the Q signal. That is, the low pass filter 319 and the low pass filter 320 eliminate unnecessary high-frequency components from the I signal and the Q signal.

In step S309, the Gold code generation unit 321 generates a pseudo-random number sequence same as the pseudo-random number sequence generated by the Gold code generation unit 114 of the transmission apparatus 200. The multiplier 322 multiplies the pseudo-random number sequence with the I signal, and the multiplier 323 multiplies the pseudo-random number sequence with the Q signal. That is, the Gold code generation unit 321, the multiplier 322, and the multiplier 323 multiply the I signal and the Q signal with the pseudo-random number sequence.

In step S310, the integrator 324 integrates the I signal for 1 bit, and the integrator 325 integrates the Q signal for 1 bit.

In step S311, the phase detection unit 326 detects the phase angle with respect to the I signal and the Q signal (that is, the reception signal).

In step S312, the demodulation unit 327 demodulates the polarity of the detected phase angle.

In step S313, the demodulation unit 327 performs the error determination by performing the CRC operation.

In step S314, when it is determined that no error occurs in the error determination in step S313, the demodulation unit 327 outputs the demodulation data obtained in step S312 (the meteorological observation data TM).

In step S315, the feedback unit 328 calculates the phase angle error from the phase angle detection result obtained in step S311, and filters the phase angle error. The feedback unit 328 controls, on the basis of the phase angle error, the oscillation frequency of the VCO 329 so that the phase detection unit 326 obtains the ±π phase angle (so as to reduce the phase angle error). The VCO output obtained by being controlled in this manner is used in the processing in step S306.

When the processing in step S315 is ended, the reception processing is ended.

The above described processing in each step can be performed in an arbitrary order, in parallel, or repeatedly as needed.

By performing each processing in the above described manner, the reception apparatus 300 can receive and accurately demodulate the wireless signal (the transmission signal TX) transmitted from the transmission apparatus 200. That is, the reception apparatus 300 can transmit a wireless signal over a longer distance while suppressing increase in the power consumption of the entire apparatus.

Figure 19:
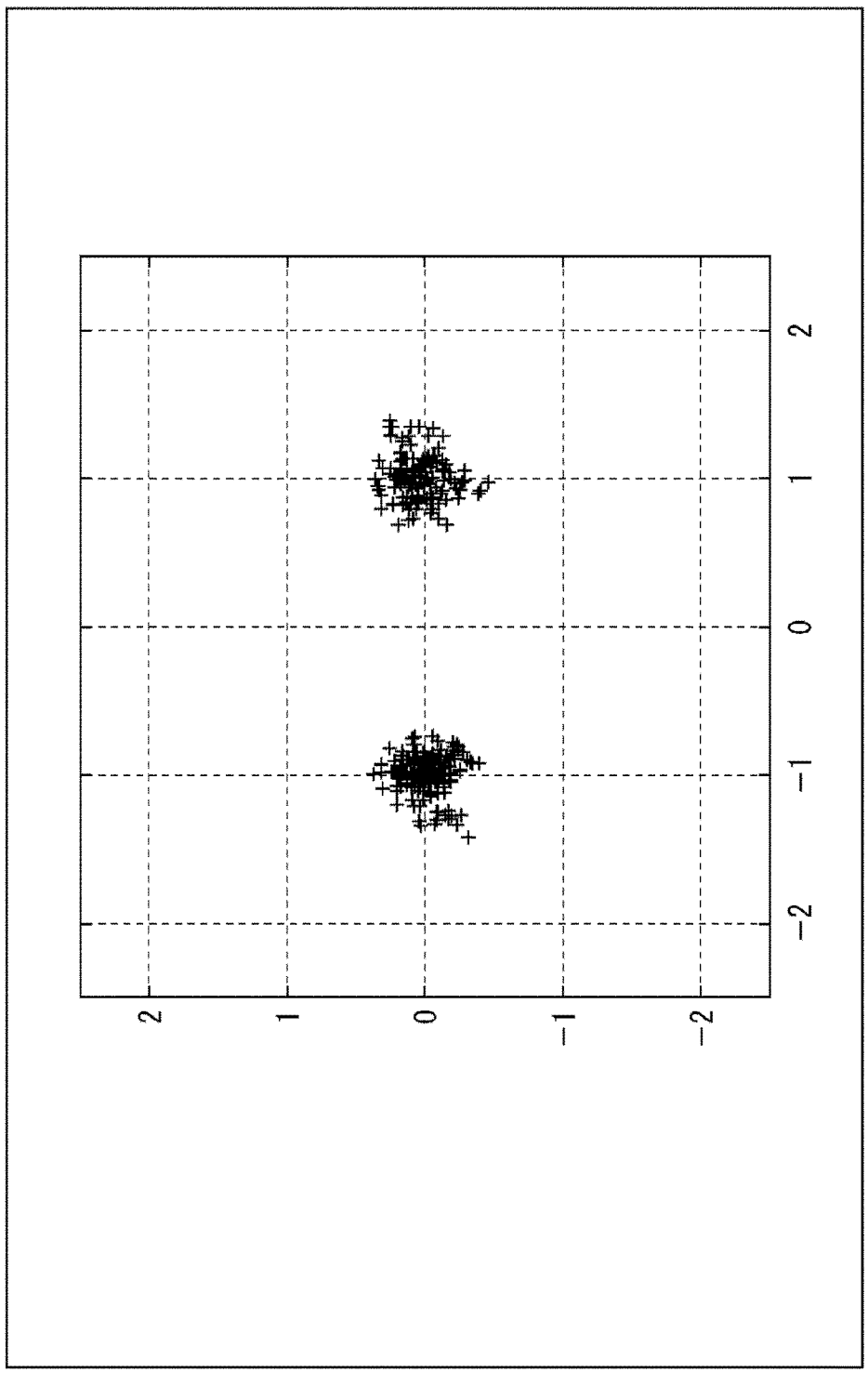
FIG. 19 is a diagram illustrating a demodulation result.

FIG. 19 is a demodulation result by applying the present embodiment when it is assumed that ε is about 0.3. This shows that the influence of the error ε is cancelled and an accurate constellation of the BPSK modulation is obtained.

Note that, in the above description, the reception apparatus 300 can handle modulation other than the modulation equivalent to the BPSK modulation (the binary phase shift modulation) (that is, can accurately perform demodulation). For example, the reception apparatus 300 can handle the modulation equivalent to the QPSK modulation (the quadrature phase shift modulation) (that is, can accurately perform demodulation).

Note that, the data to be received by the reception apparatus 300 (the transmission data QD to be output by the demodulation unit 327) is arbitrary, and is not limited to the above described meteorological observation data TM. That is, the reception apparatus 300 can be applied to an arbitrary system other than the system which observes the above described meteorological data.

Furthermore, although it has been described that the reception apparatus 300 receives a wireless signal in the above description, the signal to be received by the reception apparatus 300 is not limited to the above, and a signal to be transmitted via an arbitrary wired communication medium (the transmission signal TX) may be received.

4. Fourth Embodiment

<Transmission Apparatus>

When a transmission signal TX is generated from meteorological observation data to be transmitted, correction data may be added to a transmission data sequence PN so that a time average of the number of edges (that is, the number of edges per unit time) indicated by an edge pulse MX is to be constant.

As described above, the number of edges per unit time in the edge pulse MX is to be constant (in other words, the number of bits having a value indicating the edge per the number of unit bits is to be constant), and the number of phase shifts per unit time in the transmission signal TX is thereby to be constant. Then, if an error ε of the phase shift amount is known, the error ε can be cancelled by the phase shift at the time of the demodulation. That is, it is possible to demodulate the transmission signal TX more accurately similarly to the second embodiment.

Figure 20:
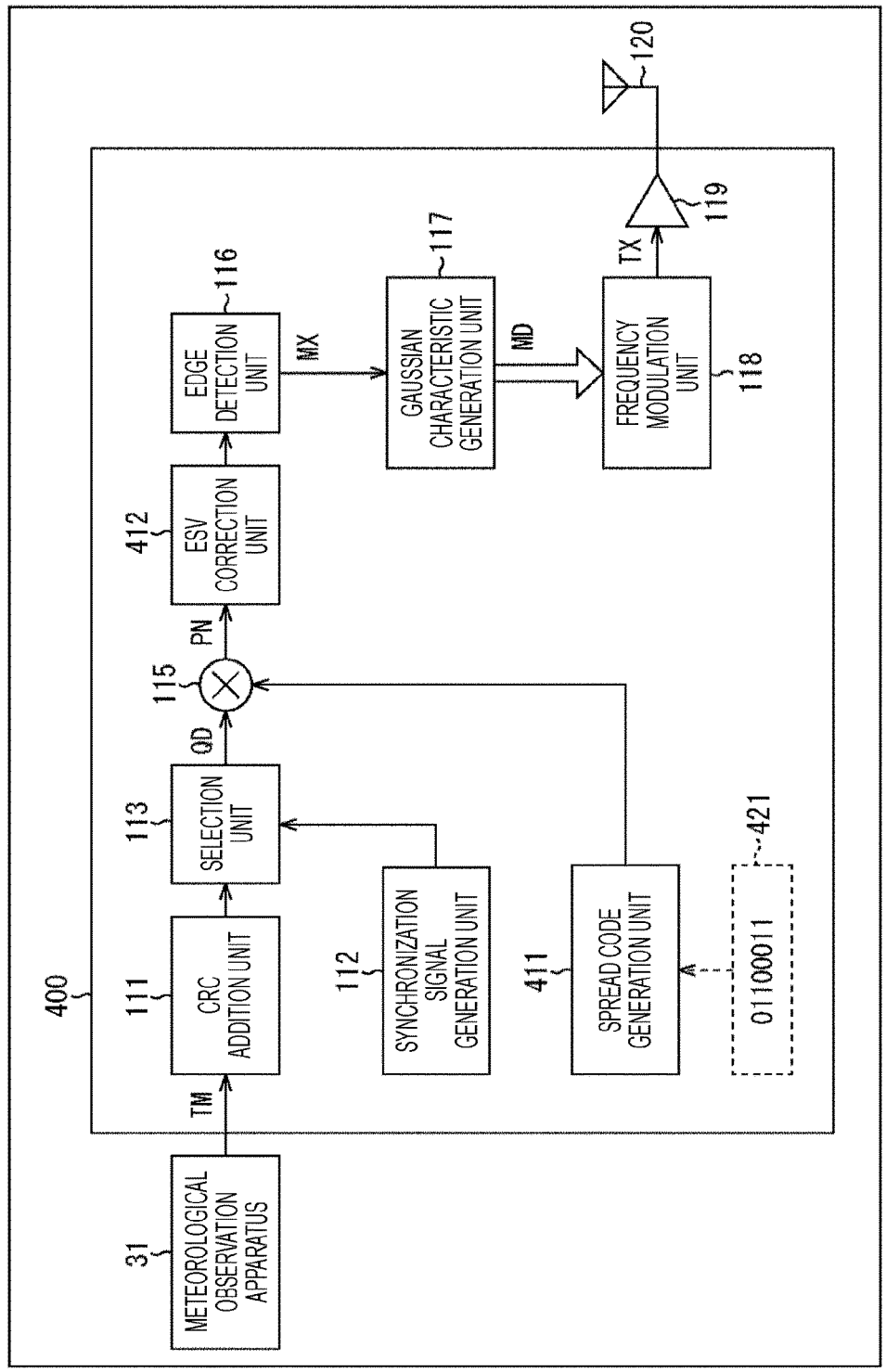
FIG. 20 is a block diagram illustrating a main configuration example of a transmission apparatus.

FIG. 20 illustrates a main configuration example of a transmission apparatus which is an embodiment of a signal processing apparatus to which the present technology in this case is applied. A transmission apparatus 400 illustrated in FIG. 20 is similar to the transmission apparatus 100 in FIG. 4, and transmits meteorological observation data supplied from a meteorological observation apparatus 31 (for example, observation data such as temperature, sunshine, rainfall, wind directions, or wind speed) as a wireless signal.

As illustrated in FIG. 20, the transmission apparatus 400 basically has a similar configuration to the transmission apparatus 100, but includes a spread code generation unit 411 instead of the Gold code generation unit 114 of the transmission apparatus 100, and further includes an edge sum value (ESV) correction unit 412.

The spread code generation unit 411 generates a spread pattern 421 which is fixed at all times (for example, "01100011"), and supplies it to a multiplier 115.

Figure 21:
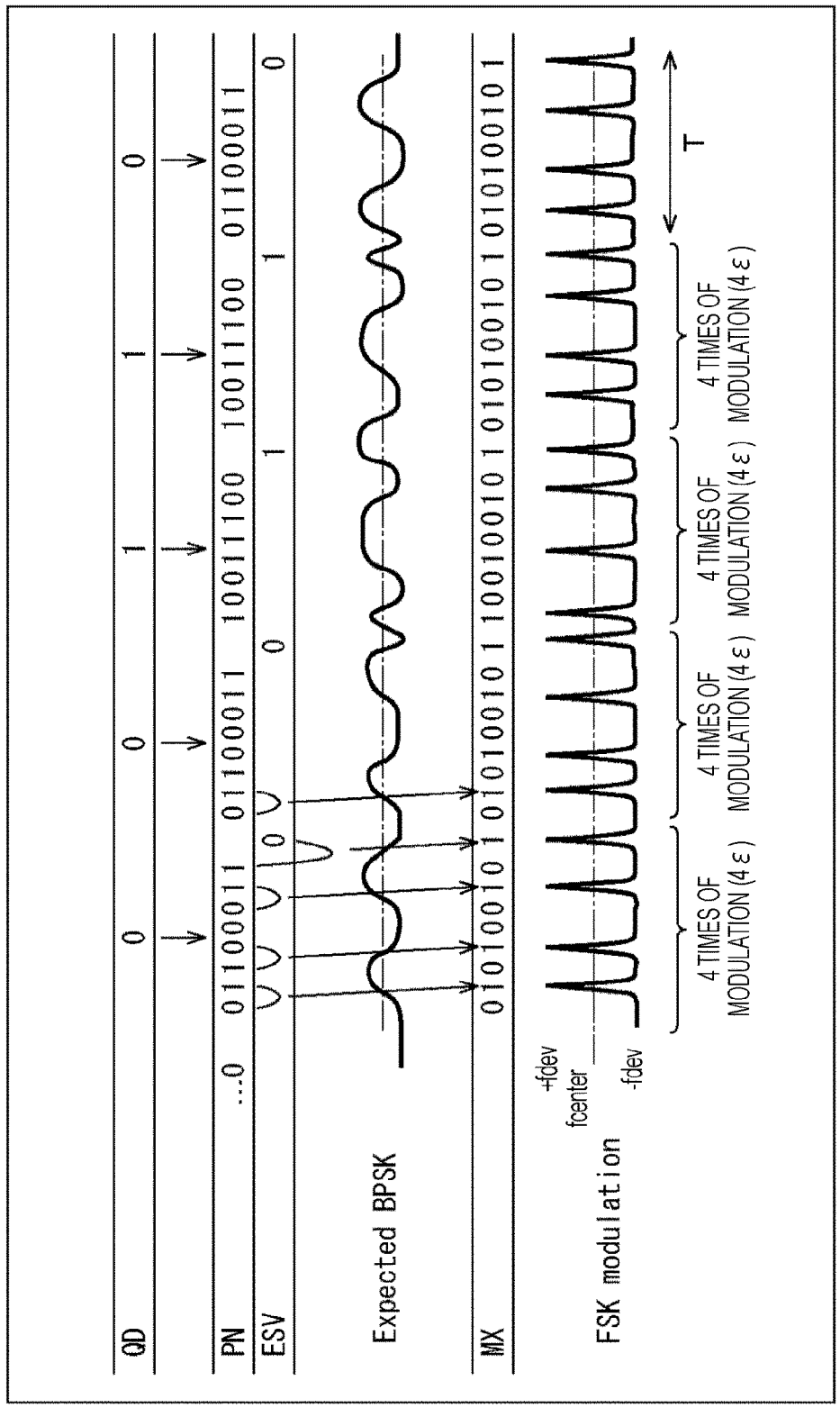
FIG. 21 is a diagram of examples of signals in units.

The multiplier 115 multiplies transmission data QD (in the example of FIG. 5, 150 bits) with the spread pattern 421 supplied from the spread code generation unit 411, and generates a transmission data sequence PN. The first row from the top of FIG. 21 illustrates an example of the transmission data QD, and the second row from the top illustrates an example of the transmission data sequence PN. That is, in this case, the multiplier 115 generates the transmission data sequence PN from the transmission data QD in the following manner.

The case in which the transmission data QD is "0"→the transmission data sequence PN="01100011"

The case in which the transmission data QD is "1"→the transmission data sequence PN="10011100"

The multiplier 115 supplies the generated transmission data sequence PN to the ESV correction unit 412.

The ESV correction unit 412 adds a 1-bit ESV correction bit every predetermined number of bits (for example, 8 bits) of the transmission data sequence PN. The value of the ESV correction bit is controlled so that the frequency of the bit of value "1" of the edge pulse MX is to be constant at all times.

The ESV correction unit 412 adds the ESV correction bit to the transmission data sequence PN, and supplies the transmission data sequence PN to the edge detection unit 116.

The edge detection unit 116 detects, similarly to the case described in the first embodiment, an edge from the transmission data sequence PN to which the ESV correction bit is added, and generates the edge pulse MX.

For example, as illustrated in FIG. 21, the 9-bit edge pulse MX in which the number of bits having value "1" is constant (for example, four) is generated every bit of the transmission data QD. At the time when the edge pulse MX is "1", the phase modulation is performed. Thus, in the example of FIG. 21, the phase modulation is performed four times every bit of the transmission data QD.

When the phase modulation amount includes the error ε, that is equivalent to that the carrier frequency is shifted by $4\varepsilon \div (2\pi T)$ (here, T is the necessary time for transmitting 1-bit of the transmission data QD).

Since the errors can be assumed as the "carrier frequency shift", the reception apparatus 300 can accurately perform demodulation by shifting the carrier frequency by $4\varepsilon \div (2\pi T)$.

That is, the transmission apparatus 400 can perform, similarly to the transmission apparatus 100, the BPSK modulation using the frequency modulation, and transmit a wireless signal over a longer distance while suppressing increase in the power consumption of the entire apparatus. Furthermore, the transmission apparatus 400 can demodulate the transmission signal TX more accurately.

Note that, the modulation speed is reduced to 3/5 in the modulation method of the transmission apparatus 200, but the reduction in the modulation speed is suppressed to 8/9 in the modulation method of the transmission apparatus 400. By combining the spread pattern and the ESV correction in this manner, it is possible to perform modulation with higher efficiency. Needless to say, the bit length of the spread pattern 421 is arbitrary. By increasing the bit length of the spread pattern 421, it is possible to enhance the efficiency.

Note that, although it has been described that the ESV correction bit is 1 bit in the above description, the number of bits of the ESV correction bit is arbitrary, and may be 2 bits or more.

<Transmission Processing Procedure>

Figure 22:
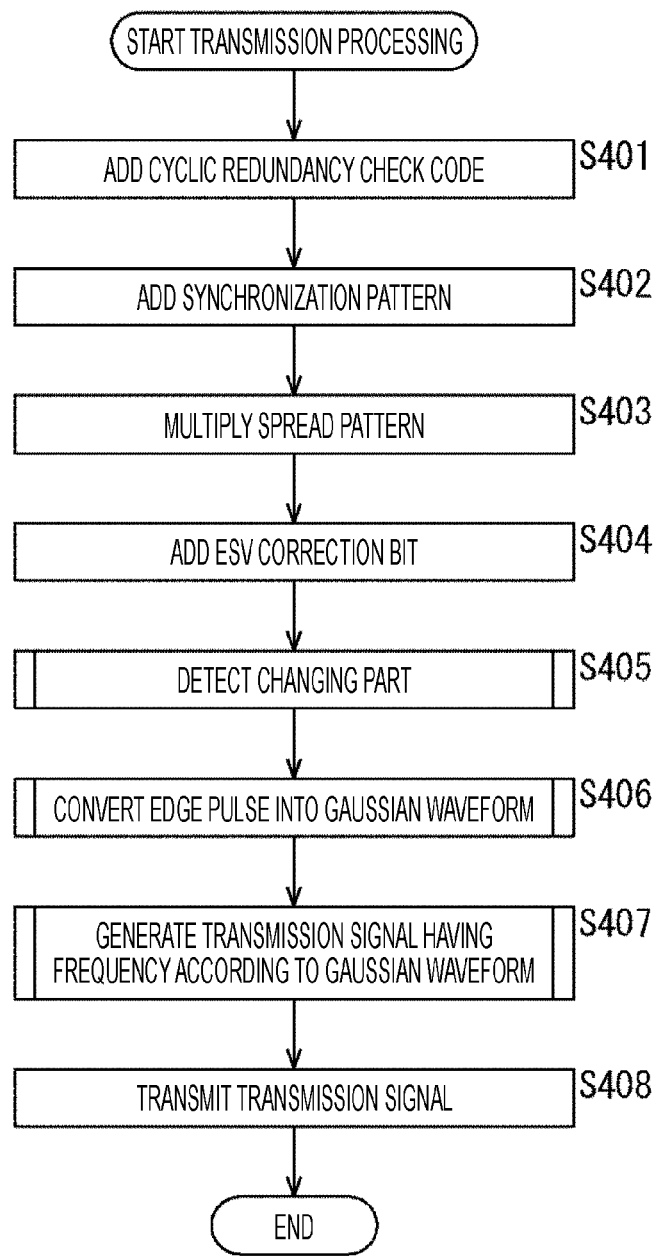
FIG. 22 is a flowchart explaining an example of a transmission processing procedure.

Next, a transmission processing procedure in this case is described with reference to the flowchart in FIG. 22.

In this case, each processing in steps S401 and S402 is performed similarly to each processing in steps S101 and S102 of FIG. 10.

In step S403, the spread code generation unit 411 generates the predetermined spread pattern 421, and the multiplier 115 multiplies the transmission data QD with the spread pattern 421, and generates the transmission data sequence PN.

In step S404, the ESV correction unit 412 adds the ESV correction bit every predetermined number of bits of the transmission data sequence PN. In other words, the ESV correction unit 412 adds the ESV correction bit so that a time average of the number of edges indicated by the edge pulse MX is to be constant (so that the number of bits of the value indicating the edge per number of unit bits of the edge pulse MX is to be constant)

Each processing in steps S405 to S408 is performed similarly to each processing in steps S104 to S107 of FIG. 10.

By performing each processing in the above described manner, the transmission apparatus 400 can perform the modulation equivalent to the BPSK modulation using the frequency modulation, and transmit a wireless signal over a longer distance while suppressing increase in the power consumption of the entire apparatus.

The transmission signal TX transmitted from the above described transmission apparatus 400 can be, similarly to the transmission signal TX transmitted from the transmission apparatus 200, received and demodulated by the above described reception apparatus 300.

Note that, similarly to the transmission apparatus 100, the transmission apparatus 400 may achieve the QPSK modulation (the quadrature phase shift modulation) as well as the BPSK modulation (the binary phase shift modulation).

Furthermore, the data to be transmitted by the transmission apparatus 400 is arbitrary, and is not limited to the above described meteorological observation data. That is, the transmission apparatus 400 can be applied to an arbitrary system other than the above described system which observes the meteorological data.

Furthermore, although it has been described that the transmission apparatus 400 transmits the transmission signal TX as a wireless signal in the above description, the transmission apparatus 400 may transmit the transmission signal TX via an arbitrary wired communication medium.

5. Fifth Embodiment

<Transmission Apparatus>

A polarity of a pulse in an edge pulse MX indicating a position of an edge by a pulse may be adjusted so that a rate of each polarity is to be equal. For example, the polarity of the pulse in the edge pulse MX may be alternately inverted.

Consequently, among a plurality of phase shifts having a direction different from each other in a transmission signal TX, it is possible to cancel an error ε included in the phase shifts. Thus, it is possible to reduce errors in the phase shift, and demodulate the transmission signal TX more accurately. Especially, by alternately inverting the polarity of the pulse in the edge pulse MX and reversing the direction of the phase shift every time, it is possible to reduce the error in the phase shift and demodulate the transmission signal TX more accurately.

Figure 23:
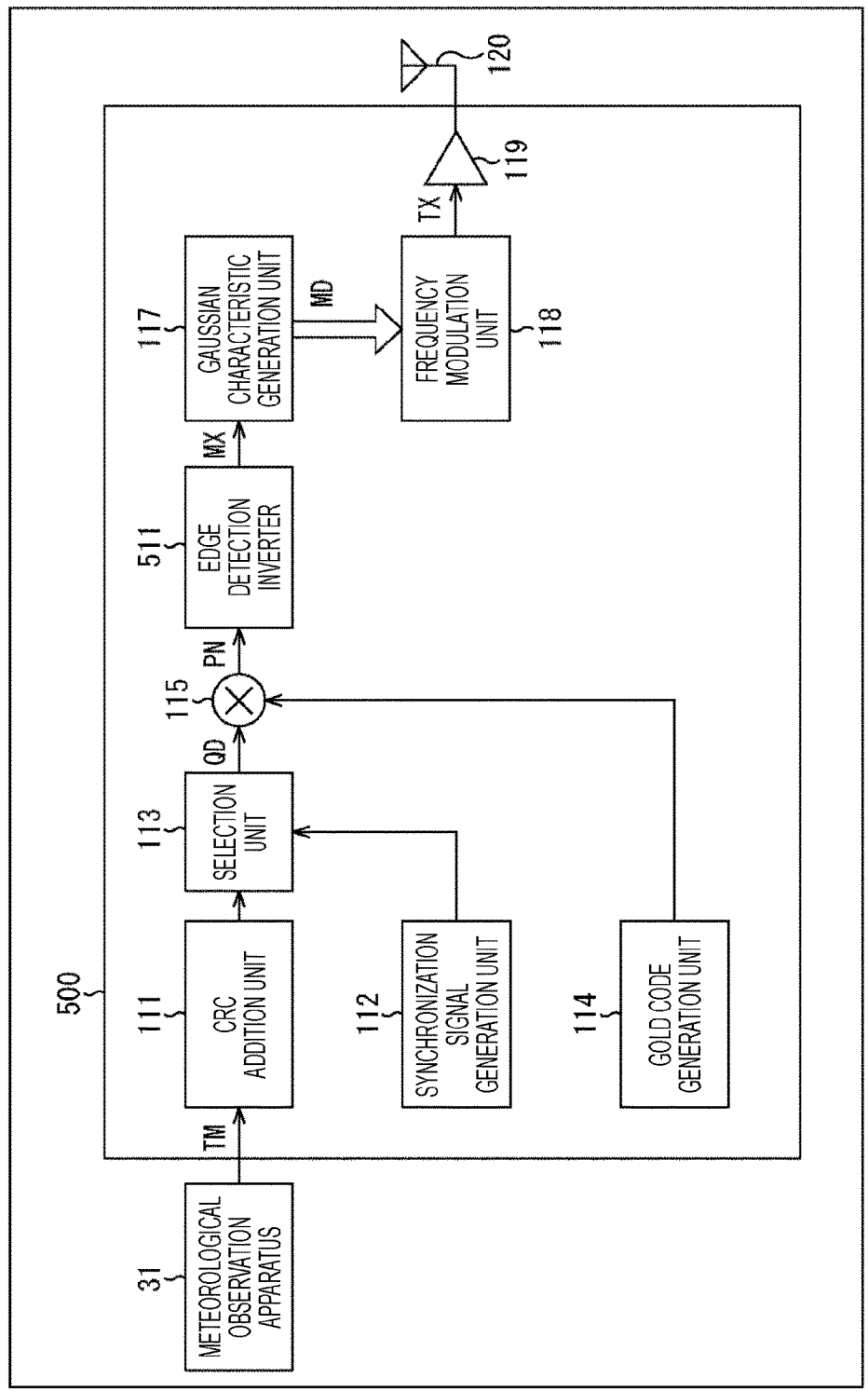
FIG. 23 is a block diagram illustrating a main configuration example of a transmission apparatus.

FIG. 23 illustrates a main configuration example of a transmission apparatus which is an embodiment of a signal processing apparatus to which the present technology in this case is applied. A transmission apparatus 500 illustrated in FIG. 23 is similar to the transmission apparatus 100 in FIG. 4, and transmits meteorological observation data supplied from a meteorological observation apparatus 31 (for example, observation data such as temperature, sunshine, rainfall, wind directions, or wind speed) as a wireless signal.

As illustrated in FIG. 23, the transmission apparatus 500 basically has a similar configuration to the transmission apparatus 100, but includes an edge detection inverter 511 instead of the edge detection unit 116 of the transmission apparatus 100.

The edge detection inverter 511 detects, similarly to the edge detection unit 116, an edge at which a value of a transmission data sequence PN supplied from a multiplier 115 is changed (from 0 to 1, or from 1 to 0), and generates the edge pulse MX indicating the position of the edge, that is, the position at which the value is changed from the previous bit in the transmission data sequence PN. However, the edge detection inverter 511 inverts the polarity of the value indicating the edge every time.

Figure 24:
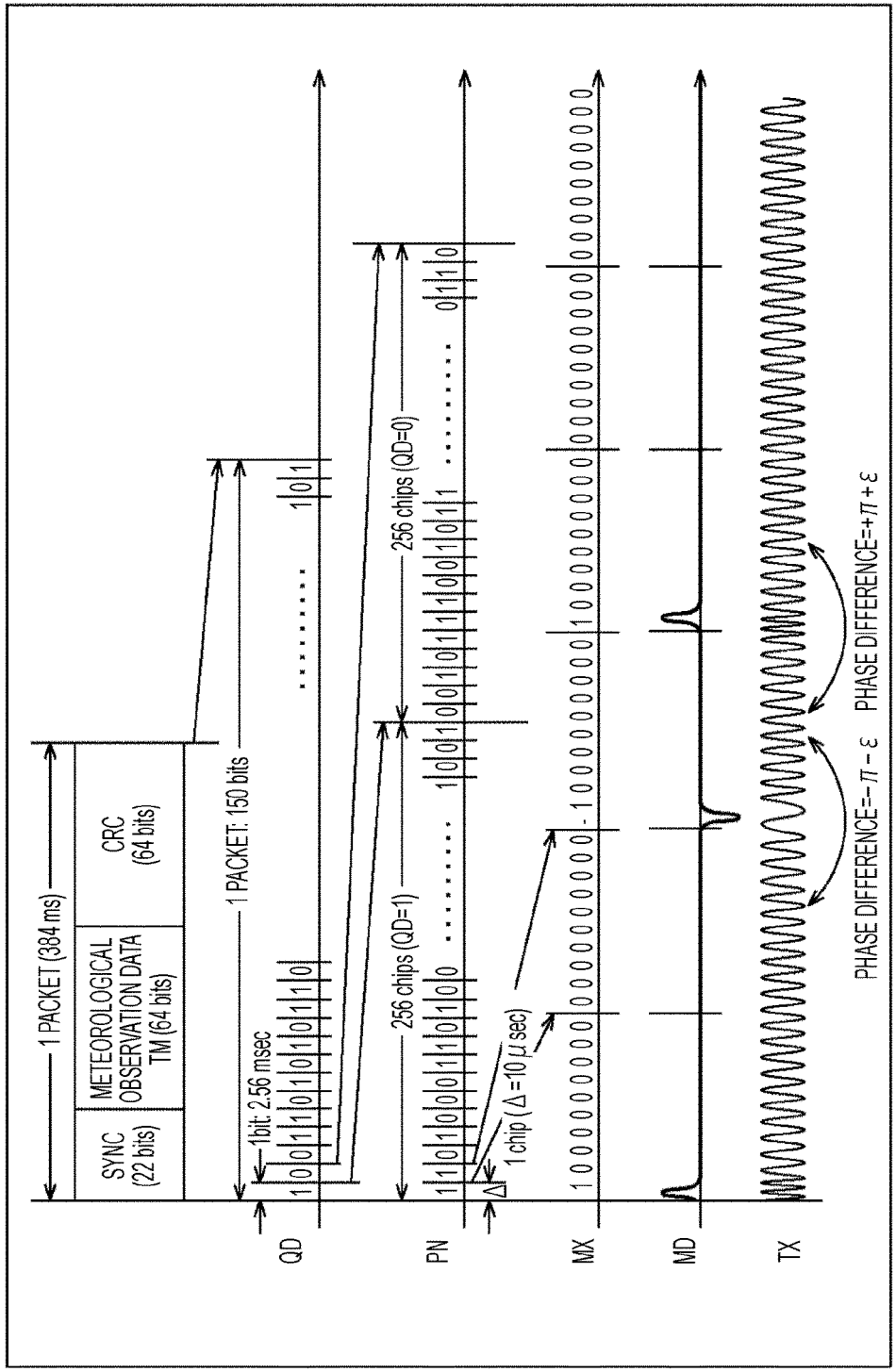
FIG. 24 is a diagram of examples of signals in units.

For example, as illustrated in FIG. 24, the edge detection inverter 511 assigns a 10-bit identification pattern "0000000000" indicating no-edge to the bit at which the value is not changed from the previous bit in the transmission data sequence PN, a 10-bit identification pattern "1000000000" indicating the edge to the odd-numbered bit at which the value is changed from the previous bit, and a 10-bit identification pattern "−1000000000" indicating the edge to the even-numbered bit at which the value is changed from the previous bit. In the edge pulse MX in this case, the value "1" or "−1" indicates the position of the edge in the transmission data sequence PN, and the value "1" and the value "−1" appear alternately.

The edge detection inverter 511 supplies the edge pulse MX in which the polarity of the edge is inverted in this manner to the Gaussian characteristic generation unit 117.

The Gaussian characteristic generation unit 117 converts, similarly to the case in the first embodiment, the edge pulse MX into a Gaussian waveform MD. When the output of the edge pulse MX is "−1", the polarity of the Gaussian waveform MD is also inverted. That is, as illustrated in FIG. 24, since the polarity of the bit indicating the edge is inverted alternately in the edge pulse MX, the polarity of the pulse indicating the edge is also inverted alternately in the Gaussian waveform MD. Thus, in the transmission signal TX, the direction of the phase shift is reversed every time. That is, the phase shift amount changes "π+ε"→"−π−ε"→"π+ε"→"−π−ε". Thus, since the phase shift amount is cancelled as +ε, −ε, +ε, −ε . . . alternately every time of the phase shift, it is possible to reduce the influence of the error ε.

<Edge Detection Inverter>

Figure 25:
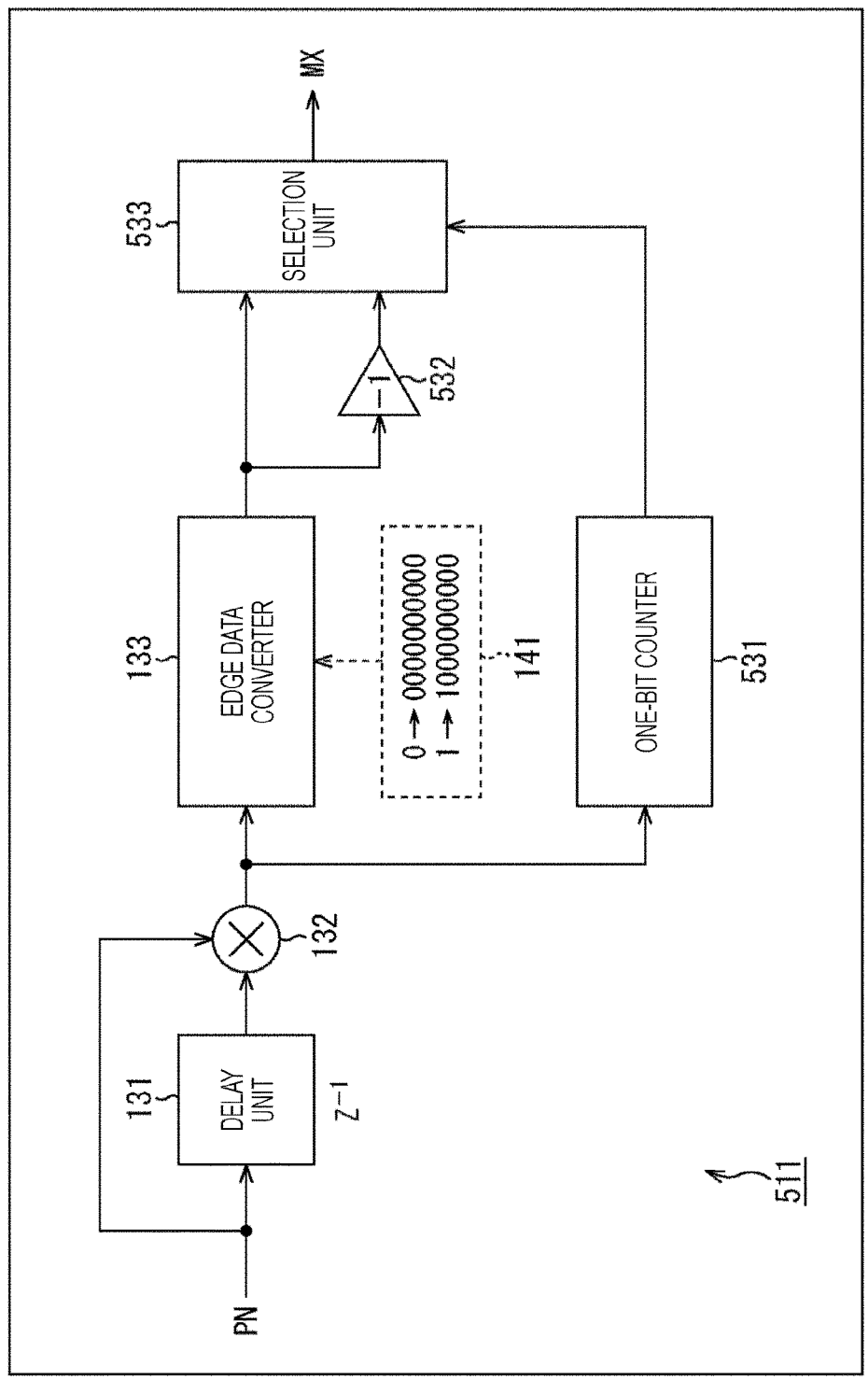
FIG. 25 is a block diagram illustrating a main configuration example of an edge detection inverter.

FIG. 25 illustrates a main configuration example of the edge detection inverter 511. In the example illustrated in FIG. 25, the edge detection inverter 511 basically has a similar configuration to the edge detection unit 116 (FIG. 6), and further includes a one-bit counter 531, a polarity inverter 532, and a selection unit 533 in addition to the configuration of the edge detection unit 116.

Similarly to the case of the edge detection unit 116 described with reference to FIG. 6, the edge in the transmission data sequence PN is detected by a delay unit 131 and an exclusive OR operation unit 132, and the edge pulse MX is generated by an edge data converter 133.

The exclusive OR operation unit 132 also supplies an exclusive OR operation result to the one-bit counter 531.

The one-bit counter 531 counts up every time the value "1" appears in the exclusive OR operation result. However, since the number of bits is 1 bit, the output of the one-bit counter 531 is changed as "1"→"0"→"1"→"0" alternately.

The one-bit counter 531 supplies the 1-bit count value to the selection unit 533.

Incidentally, the edge data converter 133 supplies the generated edge pulse MX to the polarity inverter 532 and the selection unit 533.

The polarity inverter 532 inverts the polarity of the edge pulse MX. In other words, the polarity of the bit of value "1" in the edge pulse MX is inverted to be "−1". Note that, the value "0" is output as it is. The polarity inverter 532 supplies the edge pulse MX in which the polarity is inverted to the selection unit 533.

The selection unit 533 selects, according to the count value supplied from the one-bit counter 531, the edge pulse MX supplied from the edge data converter 133 or the edge pulse MX in which the polarity is inverted supplied from the polarity inverter 532. For example, when the count value is "1", the selection unit 533 selects the edge pulse MX supplied from the edge data converter 133, and when the count value is "0", the selection unit 533 selects the edge pulse MX in which the polarity is inverted supplied from the polarity inverter 532.

The selection unit 533 performs this selection for each bit of the edge pulse MX. The selection unit 533 supplies the selected edge pulse MX to the Gaussian characteristic generation unit 117.

As described above, the transmission apparatus 500 can perform, similarly to the transmission apparatus 100, the BPSK modulation using the frequency modulation, and transmit a wireless signal over a longer distance while suppressing increase in the power consumption of the entire apparatus. Furthermore, by inverting the polarity of the pulse indicating the edge in the above described manner, the transmission apparatus 500 can demodulate the transmission signal TX more accurately.

<Transmission Processing Procedure>

Next, a transmission processing procedure in this case is described with reference to the flowchart in FIG. 26.

In this case, each processing in steps S501 to S503 is performed similarly to each processing in steps S101 to S103 of FIG. 10.

In step S504, an edge polarity inverter 511 performs edge detection inversion processing, detects a changing part (edge) in the transmission data sequence PN, and generates the edge pulse MX in which the output polarity is inverted every changing part (edge).

The processing in steps S505 to S507 is performed similarly to each processing in steps S105 to S107 of FIG. 10.

<Edge Detection Inversion Processing Procedure>

Figure 26:
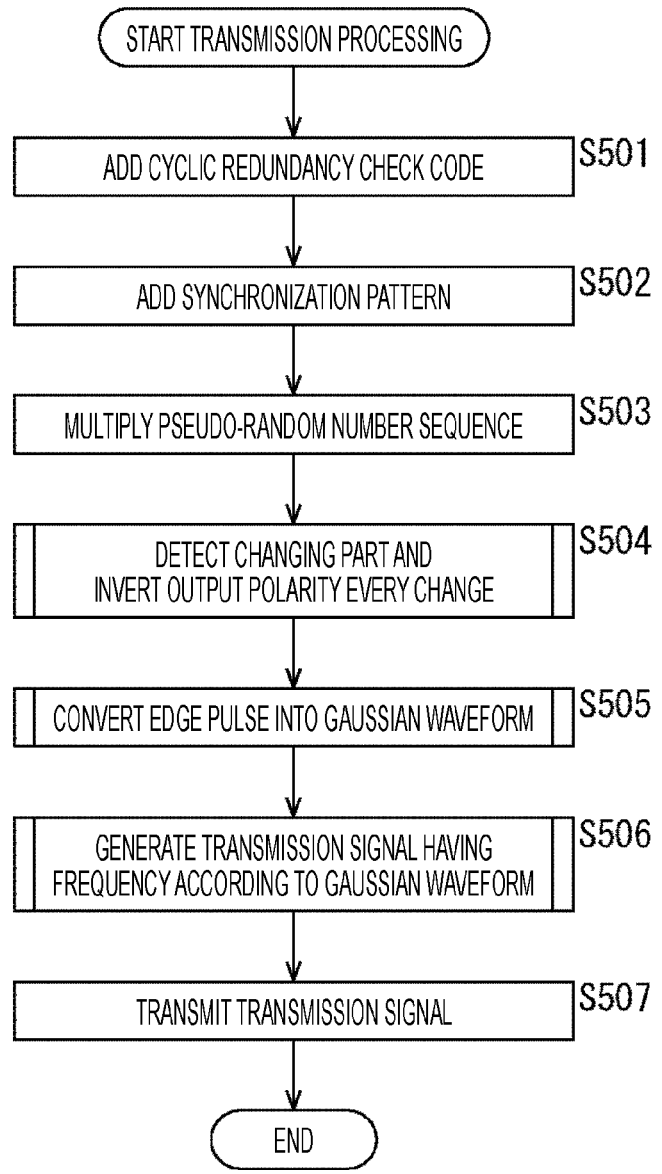
FIG. 26 is a flowchart explaining an example of a transmission processing procedure.
Figure 27:
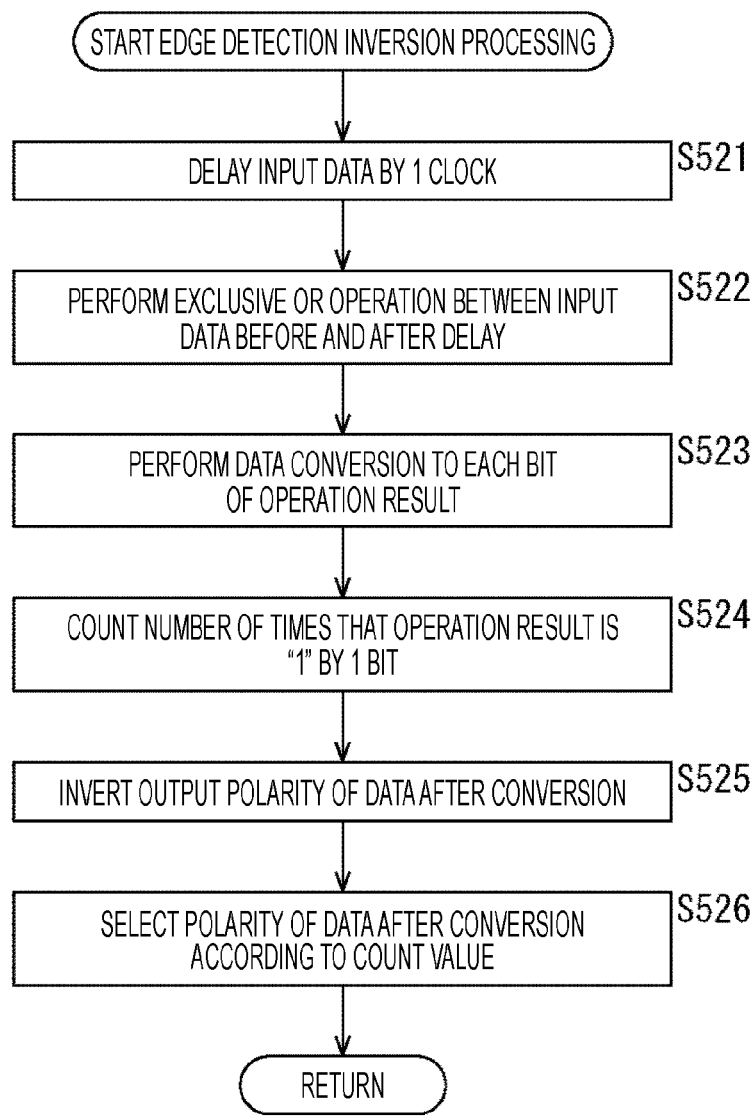
FIG. 27 is a flowchart explaining an example of an edge detection inversion processing procedure.

Next, an example of an edge detection inversion processing procedure performed in step S504 of FIG. 26 is described with reference to the flowchart in FIG. 27.

Figure 11:
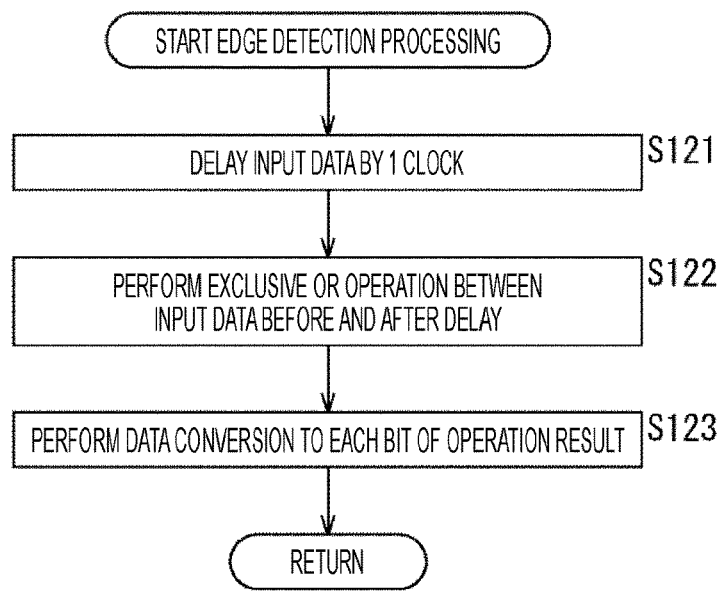
FIG. 11 is a flowchart explaining an example of an edge detection processing procedure.

Each processing in steps S521 to S523 is performed similarly to the edge detection processing in steps S121 to S123 of FIG. 11.

In step S524, the one-bit counter 531 counts, by 1 bit, the number of times that the operation result of the exclusive OR operation performed in step S522 is "1".

In step S525, the polarity inverter 532 inverts the output characteristic of the data after the data conversion in step S523 (that is, of the edge pulse MX).

In step S526, the selection unit 533 selects, according to the count value obtained in step S524, the polarity of the data after the conversion obtained by data conversion in the step S523 (that is, of the edge pulse MX). That is, the selection unit 533 selects, according to the count value obtained in step S524, the data after the conversion obtained by the data conversion in step S523 or the data after the conversion in which the polarity is inverted obtained in step S525.

When the processing in step S526 is ended, the processing returns back to FIG. 26.

By performing each processing in the above described manner, the transmission apparatus 500 can perform the modulation equivalent to the BPSK modulation using the frequency modulation, and transmit a wireless signal over a longer distance while suppressing increase in the power consumption of the entire apparatus. Then, the transmission apparatus 500 can demodulate the transmission signal TX more accurately.

The transmission signal TX to be transmitted from the above described transmission apparatus 500 can be received and demodulated by a reception apparatus which handles common BPSK modulation.

Furthermore, the data to be transmitted by the transmission apparatus 500 is arbitrary, and is not limited to the above described meteorological observation data. In other words, the transmission apparatus 500 can be applied to an arbitrary system other than the above described system which observes the meteorological data.

Furthermore, although it has been described that the transmission apparatus 500 transmits the transmission signal TX as a wireless signal in the above description, the transmission apparatus 500 may transmit the transmission signal TX via an arbitrary wired communication medium.

6. Sixth Embodiment

<Computer>

The above described series of processing may be performed by hardware or software. When a series of processing is performed by software, a program constituting the software is installed in a computer. Here, the computer includes a computer embedded in dedicated hardware and a personal computer capable of performing various functions by installing various programs.

Figure 28:
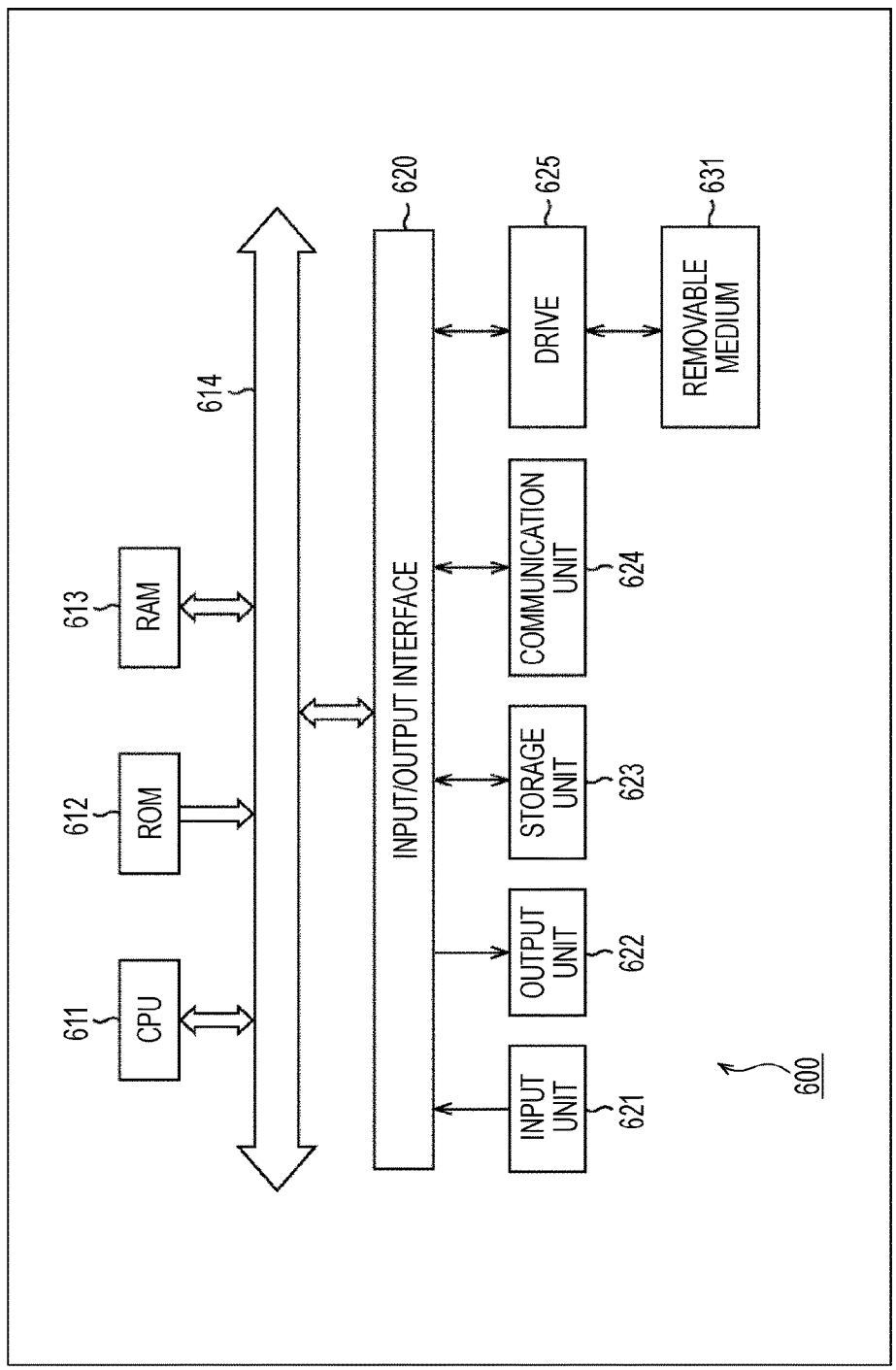
FIG. 28 is a block diagram illustrating a main configuration example of a computer.

FIG. 28 is a block diagram illustrating a hardware configuration example of a computer which performs the above described series of processing by a program.

In a computer 600 illustrated in FIG. 28, a central processing unit (CPU) 611, a read-only memory (ROM) 612, and a random-access memory (RAM) 613 are connected with each other by a bus 614.

The bus 614 is further connected to an input/output interface 620. The input/output interface 620 is connected with an input unit 621, an output unit 622, a storage unit 623, a communication unit 624, and a drive 625.

The input unit 621 includes, for example, a keyboard, a mouse, a microphone, a touch panel, and an input terminal. The output unit 622 includes, for example, a display, a speaker, and an output terminal. The storage unit 623 includes, for example, a hard disk, a RAM disk, and a nonvolatile memory. The communication unit 624 includes, for example, a network interface. The drive 625 drives a removable medium 631, such as a magnetic disc, an optical disc, a magneto-optical disc, or a semiconductor memory.

In the computer having the above configuration, the CPU 611 loads a program stored in, for example, the storage unit 623 into the RAM 613 through the input/output interface 620 and the bus 614 and executes the program, and the above described series of processing is thereby performed. In the RAM 613, data necessary for the CPU 611 to perform various types of processing and the like are appropriately stored.

The program executed by the computer (the CPU 611) can be used by being stored in the removable medium 631 as, for example, a package media or the like. In this case, the program can be installed in the storage unit 623 via the input/output interface 620 by attaching the removable medium 631 to the drive 625.

Furthermore, the program can be provided through a wired or wireless transmission media, such as a local area network, the internet, the digital satellite broadcasting. In this case, the program can be received by the communication unit 624 and installed in the storage unit 623.

In addition to the above, the program can be pre-installed in the ROM 612 or the storage unit 623.

Note that, the program executed by the computer may be a program in which the processing is performed in the order described in the present specification in time series, or a program in which the processing is performed in parallel or at necessary timing, for example, when it is called.

Furthermore, in the present specification, the steps describing a program recorded in a recording medium include not only processing to be performed in the described order in time series but also processing, which is not necessarily performed in time series, to be performed in parallel or independently.

Moreover, the above described processing in each step can be performed in the above described apparatuses or an arbitrary apparatus other than the above described apparatuses. In this case, an apparatus which performs the processing is to have a function (a functional block or the like) necessary for performing the above described processing. Furthermore, information necessary for the processing is to be appropriately transmitted to the apparatus.

Moreover, in the present specification, a system means a collection of a plurality of constituent elements (apparatuses, modules (parts), and the like), and all constituent elements are not necessarily in a same casing. Thus, both of a plurality of apparatuses stored in separated casings and connected with each other via a network, and an apparatus having a plurality of modules in a casing area system.

Furthermore, a configuration described as one apparatus (or one processing unit) in the above description may be divided and configured as a plurality of apparatuses (or a plurality of processing units). Alternatively, configurations described as a plurality of apparatuses (or a plurality of processing units) in the above description may be integrated and configured as one apparatus (or a one processing unit). Furthermore, a configuration other than the above described configurations may be naturally added to the configuration of each apparatus (or each processing unit). Moreover, as long as the configuration or the operation of the system as a whole is substantially equal, a part of a configuration of an apparatus (or a processing unit) may be included in the other apparatuses (or the other processing units).

Although suitable embodiments of the present disclosure have been detailedly described with reference to the attached drawings, the technical range of the present disclosure is not limited to the above examples. It is obvious that a person with ordinary skill in the technical field of the present disclosure can conceive various modifications or corrections within the scope of the technical ideas described in claims, and it is understood that those naturally belong to the technical range of the present disclosure.

For example, the present technology can be a configuration of cloud computing in which a function is shared/cooperatively processed by a plurality of apparatuses via a network.

Furthermore, each step described in the above described flowcharts can be performed by one apparatus, or shared and performed by a plurality of apparatuses.

Moreover, when a step includes a plurality of processes, the plurality of process included in the step can be performed by an apparatus, or shared and performed by a plurality of apparatuses.

Furthermore, the present technology is not limited to this, and can be implemented as any configuration equipped with such an apparatus or an apparatus constituting a system, such as a processor as a system large scale integration (LSI) or the like, a module using a plurality of processors or the like, a unit using a plurality of modules or the like, or a set in which other functions are further added to the unit or the like (that is, a part of a configuration of an apparatus).

Note that, the present technology may have the following configurations.

(1) A signal processing apparatus including:

a control data generation unit which generates control data, which is for controlling frequency modulation to a carrier signal using digital data to be transmitted, and for suppressing a time average of a fluctuation amount of a frequency modulation amount more than a case of controlling the frequency modulation to the carrier signal using the digital data;

a frequency modulation unit which performs the frequency modulation to the carrier signal on the basis of the control data generated by the control data generation unit; and a transmission unit which transmits, as a transmission signal, the carrier signal to which the frequency modulation is performed by the frequency modulation unit.

(2) The signal processing apparatus according to (1), in which the control data generation unit includes:

an edge detection unit which detects an edge at which a value of the digital data is changed; and an edge data generation unit which generates, as the control data, edge data indicating a position of the edge detected by the edge detection unit at a time interval shorter than a time interval of the edge in the digital data.

(3) The signal processing apparatus according to (2), in which the edge detection unit detects the edge by performing an exclusive OR operation between adjacent bits of the digital data, and the edge data generation unit generates the edge data by increasing a bit length of a detection result of the edge generated by the edge detection unit.

(4) The signal processing apparatus according to (3), in which the edge detection unit generates 1-bit data indicating a result of the exclusive OR operation between the bits as the detection result of the edge, and the edge data generation unit converts the 1-bit data generated by the edge detection unit into 10-bit data.

(5) The signal processing apparatus according to any one of (2) to (3), in which the control data generation unit further includes a data converter which converts the digital data such that a time average of the edge in the digital data is to be constant, and the edge detection unit detects the edge in the digital data converted by the data converter.

(6) The signal processing apparatus according to (5), in which the data converter converts, on the basis of a predetermined conversion table, the digital data every predetermined bit length.

(7) The signal processing apparatus according to (6), in which the data converter identifies, every 3 bits, a value of the 3 bits of the digital data, and converts the 3 bits into 5-bit data in which the number of edges is constant.

(8) The signal processing apparatus according to any one of (2) to (7), in which the control data generation unit further includes a correction data addition unit which adds correction data to the digital data such that a time average of the number of edges indicated by the edge data is to be constant, and the edge detection unit detects the edge in the digital data to which the correction data is added by the correction data addition unit.

(9) The signal processing apparatus according to (8), in which the correction data is 1-bit data.

(10) The signal processing apparatus according to any one of (2) to (9), in which the edge data generation unit generates the edge data indicating the position of the edge by a pulse, and the control data generation unit further includes a polarity adjustment unit which adjusts a polarity of the pulse in the edge data generated by the edge data generation unit such that a rate of each polarity is to be equal.

(11) The signal processing apparatus according to (10), in which the edge data generation unit generates the edge data indicating the position of the edge by a pulse having a positive polarity, and the polarity adjustment unit converts, by alternately inverting the polarity of the pulse in the edge data generated by the edge data generation unit, the pulse having the positive polarity into a pulse having a negative polarity.

(12) The signal processing apparatus according to any one of (1) to (11), in which the frequency modulation unit performs binary phase shift modulation to a phase of the carrier signal by performing the frequency modulation to the carrier signal on the basis of the control data.

(13) The signal processing apparatus according to any one of (1) to (12), in which the frequency modulation unit performs quadrature phase shift modulation to a phase of the carrier signal by performing the frequency modulation to the carrier signal on the basis of the control data.

(14) The signal processing apparatus according to any one of (1) to (13), in which the frequency modulation unit performs the frequency modulation to the carrier signal using a fractional PLL in which the frequency modulation is performed by demodulating a division ratio used when an oscillation signal is divided and phase comparison is performed in a PLL.

(15) The signal processing apparatus according to any one of (1) to (14), further including:
a Gaussian waveform generation unit which generates a Gaussian waveform according to the control data generated by the control data generation unit, in which
the frequency modulation unit performs the frequency modulation to the carrier signal using the Gaussian waveform generated by the Gaussian waveform generation unit.

(16) A signal processing method including:
generating control data, which is for controlling frequency modulation of a carrier signal using digital data to be transmitted, and for suppressing a fluctuation amount of a time average of a frequency modulation amount more than a case in which the frequency modulation of the carrier signal is controlled using the digital data;
performing frequency modulation to the carrier signal on the basis of the generated control data; and
transmitting, as a transmission signal, the carrier signal to which the frequency modulation is performed.

(17) A program causing a computer to function as:
a control data generation unit which generates control data, which is for controlling frequency modulation to a carrier signal using digital data to be transmitted, and for suppressing a time average of a fluctuation amount of a frequency modulation amount more than a case of controlling the frequency modulation to the carrier signal using the digital data;
a frequency modulation unit which performs the frequency modulation to the carrier signal on the basis of the control data generated by the control data generation unit; and a transmission control unit which transmits, as a transmission signal, the carrier signal to which the frequency modulation is performed by the frequency modulation unit from a transmission unit.

(18) A signal processing apparatus including:
a reception unit which receives a transmission signal in which frequency modulation is performed to a carrier signal on the basis of control data, which is for controlling the frequency modulation to the carrier signal using digital data to be transmitted, and for suppressing a time average of a fluctuation amount of a frequency modulation amount more than a case of controlling the frequency modulation to the carrier signal using the digital data;
an oscillation signal generation unit which corrects a frequency of a reception signal which is the transmission signal received by the reception unit for a shift amount of a carrier frequency of the reception signal due to a phase shift caused by the frequency modulation, and further generates an oscillation signal for converting the frequency of the reception signal into a predetermined intermediate frequency;
a frequency converter which converts the frequency of the reception signal into the intermediate frequency using the oscillation signal generated by the oscillation signal generation unit; and
a demodulation unit which detects and demodulates a phase of the reception signal converted into the intermediate frequency by the frequency converter.

(19) A signal processing method including:
receiving a transmission signal in which frequency modulation is performed to a carrier signal on the basis of control data, which is for controlling the frequency modulation to the carrier signal using digital data to be transmitted, and for suppressing a time average of a fluctuation amount of a frequency modulation amount more than a case of controlling the frequency modulation to the carrier signal using the digital data;
correcting a frequency of a reception signal which is the received transmission signal for a shift amount of a carrier frequency of the reception signal due to a phase shift caused by the frequency modulation, and further generating an oscillation signal for converting the frequency of the reception signal into a predetermined intermediate frequency;
converting the frequency of the reception signal into the intermediate frequency using the generated oscillation signal; and
detecting and demodulating a phase of the reception signal converted into the intermediate frequency.

(20) A program causing a computer to function as:
a reception control unit which causes a reception unit to receive a transmission signal in which frequency modulation is performed to a carrier signal on the basis of control data, which is for controlling the frequency modulation to the carrier signal using digital data to be transmitted, and for suppressing a time average of a fluctuation amount of a frequency modulation amount more than a case of controlling the frequency modulation to the carrier signal using the digital data;
an oscillation signal generation unit which corrects a frequency of a reception signal which is the transmission signal received under the control of the reception control unit for a shift amount of a carrier frequency of the reception signal due to a phase shift caused by the frequency modulation, and further generates an oscillation signal for converting the frequency of the reception signal into a predetermined intermediate frequency;
a frequency converter which converts the frequency of the reception signal into the intermediate frequency using the oscillation signal generated by the oscillation signal generation unit; and
a demodulation unit which detects and demodulates a phase of the reception signal converted into the intermediate frequency by the frequency converter.

(21) A signal processing apparatus including:
a frequency modulation unit which performs frequency modulation to a carrier signal using digital data to be transmitted so as to control a phase every predetermined unit time; and
a transmission unit which transmits, as a transmission signal, the carrier signal to which the frequency modulation is performed by the frequency modulation unit.

(22) The signal processing apparatus according to (21), in which the frequency modulation unit performs binary phase shift modulation to a phase of the carrier signal by performing the frequency modulation to the carrier signal such that the phase of the carrier signal is to be either of predetermined two phases every unit time.

(23) The signal processing apparatus according to (21), in which the frequency modulation unit performs quadrature phase shift modulation to a phase of the carrier signal by performing the frequency modulation to the carrier signal such that the phase of the carrier signal is to be either of predetermined four phases every unit time.

(24) The signal processing apparatus according to any one of (21) to (23), in which the frequency modulation unit performs the frequency modulation to the carrier signal using a fractional PLL in which the frequency modulation is performed by demodulating a division ratio used when an oscillation signal is divided and phase comparison is performed in a PLL.

(25) The signal processing apparatus according to any one of (21) to (24) further including:
a control data generation unit which generates control data for controlling the phase using the digital data to be transmitted every unit time, in which
the frequency modulation unit performs, on the basis of the control data generated by the control data generation unit, the frequency modulation to the carrier signal.

(26) The signal processing apparatus according to (25), in which
the control data generation unit generates, as the control data, a Gaussian waveform capable of including a pulse waveform for controlling the frequency modulation unit every unit time so that the phase of the carrier signal is changed by a predetermined amount, and
the frequency modulation unit performs the frequency modulation to the carrier signal so that the phase of the carrier signal is to be changed by the predetermined amount according to the pulse waveform part of the Gaussian waveform generated by the control data generation unit.

(27) The signal processing apparatus according to (26), in which
the control data generation unit detects an edge at which a value of the digital data is changed, and generates the Gaussian waveform indicating a position of the detected edge by the pulse waveform, and
the frequency modulation unit performs, on the basis of the Gaussian waveform generated by the control data generation unit, the frequency modulation to the carrier signal.

(28) The signal processing apparatus according to (27), in which
the unit time is a time interval of each data of the digital data, and
the pulse waveform is a waveform shorter than the unit time.

(29) The signal processing apparatus according to (27) or (28), in which the control data generation unit detects the edge by performing an exclusive OR operation between adjacent bits of the digital data.

(30) The signal processing apparatus according to any one of (27) to (29), in which the control data generation unit converts the digital data so that a time average of the edge in the digital data is to be constant, and detects the edge in the converted digital data.

(31) The signal processing apparatus according to (30), in which the control data generation unit converts, on the basis of a predetermined conversion table, the digital data every predetermined bit length.

(32) The signal processing apparatus according to (31), in which the control data generation unit identifies, every 3 bits, a value of the 3 bits of the digital data, and converts the 3 bits into 5-bit data in which the number of edges is constant.

(33) The signal processing apparatus according to any one of (27) to (32) in which the control data generation unit adds correction data to the digital data so that a time average of the number of edges to be detected is to be constant, and detects the edge in the digital data to which the correction data is added.

(34) The signal processing apparatus according to (33), in which the correction data is 1-bit data.

(35) The signal processing apparatus according to any one of (27) to (34) in which the control data generation unit alternately inverts a polarity of the pulse waveform.

(36) A signal processing method including:
performing frequency modulation to a carrier signal using digital data to be transmitted so as to control a phase every predetermined unit time; and
transmitting, as a transmission signal, the carrier signal to which the frequency modulation is performed.

(37) A program causing a computer to function as:
a frequency modulation unit which performs frequency modulation to a carrier signal using digital data to be transmitted so as to control a phase every predetermined unit time; and
a transmission unit which transmits, as a transmission signal, the carrier signal to which the frequency modulation is performed by the frequency modulation unit.

(38) A signal processing apparatus including:
a reception unit which receives a transmission signal in which frequency modulation is performed to a carrier signal using digital data to be transmitted so as to control a phase every predetermined unit time;
an oscillation signal generation unit which corrects a frequency of a reception signal which is the transmission signal received by the reception unit for a shift amount of a carrier frequency of the reception signal due to a phase shift caused by the frequency modulation, and further generates an oscillation signal for converting the frequency of the reception signal into a predetermined intermediate frequency;
a frequency converter which converts the frequency of the reception signal into the intermediate frequency using the oscillation signal generated by the oscillation signal generation unit; and
a demodulation unit which detects and demodulates a phase of the reception signal converted into the intermediate frequency by the frequency converter.

(39) A signal processing method including:
receiving a transmission signal in which frequency modulation is performed to a carrier signal using digital data to be transmitted so as to control a phase every predetermined unit time;
correcting a frequency of a reception signal which is the received transmission signal for a shift amount of a carrier frequency of the reception signal due to a phase shift caused by the frequency modulation, and further generating an oscillation signal for converting the frequency of the reception signal into a predetermined intermediate frequency;
converting the frequency of the reception signal into the intermediate frequency using the generated oscillation signal; and
detecting and demodulating a phase of the reception signal converted into the intermediate frequency.

(40) A program causing a computer to function as:
a reception control unit which causes a reception unit to receive a transmission signal in which frequency modulation is performed to a carrier signal using digital data to be transmitted so as to control a phase every predetermined unit time;
an oscillation signal generation unit which corrects a frequency of a reception signal which is the transmission signal received under the control of the reception control unit for a shift amount of a carrier frequency of the reception signal due to a phase shift caused by the frequency modulation, and further generates an oscillation signal for converting the frequency of the reception signal into a predetermined intermediate frequency;

a frequency converter which converts the frequency of the reception signal into the intermediate frequency using the oscillation signal generated by the oscillation signal generation unit; and a demodulation unit which detects and demodulates a phase of the reception signal converted into the intermediate frequency by the frequency converter.

REFERENCE SIGNS LIST

100 Transmission apparatus
111 CRC addition unit
112 Synchronization signal generation unit
113 Selection unit
114 Gold code generation unit
115 Multiplier
116 Edge detection unit
117 Gaussian characteristic generation unit
118 Frequency modulation unit
119 Amplifier
120 Antenna
131 Delay unit
132 Exclusive OR operation unit
133 Edge data converter
141 Conversion table
151 Sequencer
152 Counter
153 Gaussian characteristic converter
154 Addition unit
161 Gaussian characteristic table
171 Reference oscillator
172 Phase comparator
173 Characteristic filter
174 VCO
175 Buffer amplifier
176 Fractional divider
200 Transmission apparatus
211 3/5 converter
221 Conversion table
300 Reception apparatus
311 Antenna
312 Low-noise amplifier
313 SAW filter
314 Local oscillator
315 Multiplier
316 Bandpass filter
317, 318 Multiplier
319, 320 Low pass filter
321 Gold code generation unit
322, 323 Multiplier
324, 325 Integrator
326 Phase detection unit
327 Demodulation unit
328 Feedback unit
329 VCO
330 90-degree shifter
400 Transmission apparatus
411 Spread code generation unit
412 ESV correction unit
421 Spread pattern
500 Transmission apparatus
511 Edge detection inverter
531 one-bit counter
532 Polarity inverter
533 Selection unit
600 Computer

The invention claimed is:

1. A signal processing apparatus comprising:
a control data generation unit configured to generate control data based on an edge at which a value of a digital data to be transmitted is changed, wherein the control data is used for controlling frequency modulation to a carrier signal;
a frequency modulation unit configured to perform the frequency modulation to the carrier signal on the basis of the control data generated by the control data generation unit; and
a transmission unit configured to transmit, as a transmission signal, the carrier signal to which the frequency modulation is performed by the frequency modulation unit,
wherein the control data generation unit comprises:
an edge detection unit configured to detect the edge at which the value of the digital data is changed; and
an edge data generation unit configured to generate, as the control data, edge data indicating a position of the edge detected by the edge detection unit at a time interval shorter than a time interval of the edge in the digital data, and
wherein the control data generation unit further comprises a data converter configured to convert the digital data such that a time average of the edge in the digital data is constant, and
the edge detection unit detects the edge in the digital data converted by the data converter.

2. The signal processing apparatus according to claim 1, wherein
the edge detection unit detects the edge by performing an exclusive OR operation between adjacent bits of the digital data, and
the edge data generation unit generates the edge data by increasing a bit length of a detection result of the edge generated by the edge detection unit.

3. The signal processing apparatus according to claim 2, wherein
the edge detection unit generates 1-bit data indicating a result of the exclusive OR operation between the bits as the detection result of the edge, and
the edge data generation unit converts the 1-bit data generated by the edge detection unit into 10-bit data.

4. The signal processing apparatus according to claim 1, wherein the data converter converts, on the basis of a predetermined conversion table, the digital data every predetermined bit length.

5. The signal processing apparatus according to claim 4, wherein the data converter identifies, every 3 bits, a value of the 3 bits of the digital data, and converts the 3 bits into 5-bit data in which the number of edges is constant.

6. The signal processing apparatus according to claim 1, wherein
the control data generation unit further comprises a correction data addition unit configured to add correction data to the digital data such that a time average of the number of edges indicated by the edge data is constant, and
the edge detection unit detects the edge in the digital data to which the correction data is added by the correction data addition unit.

7. The signal processing apparatus according to claim 6, wherein the correction data is 1-bit data.

8. The signal processing apparatus according to claim 1, wherein
the edge data generation unit generates the edge data indicating the position of the edge by a pulse, and
the control data generation unit further comprises a polarity adjustment unit configured to adjust a polarity of the pulse in the edge data generated by the edge data generation unit such that a rate of each polarity is equal.

9. The signal processing apparatus according to claim 8, wherein
the edge data generation unit generates the edge data indicating the position of the edge by a pulse having a positive polarity, and
the polarity adjustment unit converts, by alternately inverting the polarity of the pulse in the edge data generated by the edge data generation unit, the pulse having the positive polarity into a pulse having a negative polarity.

10. The signal processing apparatus according to claim 1, wherein the frequency modulation unit performs binary phase shift modulation to a phase of the carrier signal by performing the frequency modulation to the carrier signal on the basis of the control data.

11. The signal processing apparatus according to claim 1, wherein the frequency modulation unit performs quadrature phase shift modulation to a phase of the carrier signal by performing the frequency modulation to the carrier signal on the basis of the control data.

12. The signal processing apparatus according to claim 1, wherein the frequency modulation unit performs the frequency modulation to the carrier signal using a fractional PLL in which the frequency modulation is performed by demodulating a division ratio used when an oscillation signal is divided and phase comparison is performed in a PLL.

13. The signal processing apparatus according to claim 1, further comprising:
a Gaussian waveform generation unit configured to generate a Gaussian waveform according to the control data generated by the control data generation unit, wherein
the frequency modulation unit performs the frequency modulation to the carrier signal using the Gaussian waveform generated by the Gaussian waveform generation unit.

14. A signal processing apparatus comprising:
a controller configured to generate control data based on an edge at which a value of a digital data to be transmitted is changed, wherein the control data is used for controlling frequency modulation to a carrier signal;
frequency modulation circuitry configured to perform the frequency modulation to the carrier signal on the basis of the control data generated by the controller; and
transmission circuitry configured to transmit, as a transmission signal, the carrier signal to which the frequency modulation is performed by the frequency modulation circuitry,
wherein the controller is configured to perform edge detection that detects the edge at which the value of the digital data is changed, and edge data generation that generates, as the control data, edge data indicating a position of the edge detected by the edge detection at a time interval shorter than a time interval of the edge in the digital data,
the controller is configured to perform data conversion that converts the digital data such that a time average of the edge in the digital data is constant, and
the edge detection detects the edge in the digital data converted by the data conversion.

15. The signal processing apparatus according to claim 14, wherein
the edge detection detects the edge by performing an exclusive OR operation between adjacent bits of the digital data, and
the edge data generation generates the edge data by increasing a bit length of a detection result of the edge generated by the edge detection.

16. The signal processing apparatus according to claim 15, wherein
the edge detection generates 1-bit data indicating a result of the exclusive OR operation between the bits as the detection result of the edge, and
the edge data generation converts the 1-bit data generated by the edge detection into 10-bit data.

17. The signal processing apparatus according to claim 14, wherein the data conversion converts, on the basis of a predetermined conversion table, the digital data every predetermined bit length.

18. The signal processing apparatus according to claim 17, wherein the data conversion identifies, every 3 bits, a value of the 3 bits of the digital data, and converts the 3 bits into 5-bit data in which the number of edges is constant.

19. The signal processing apparatus according to claim 14, wherein
the controller is configured to perform correction data addition that adds correction data to the digital data such that a time average of the number of edges indicated by the edge data is constant, and
the edge detection detects the edge in the digital data to which the correction data is added by the correction data addition.

20. The signal processing apparatus according to claim 19, wherein the correction data is 1-bit data.

21. The signal processing apparatus according to claim 14, wherein the frequency modulation circuitry performs binary phase shift modulation to a phase of the carrier signal by performing the frequency modulation to the carrier signal on the basis of the control data.

22. The signal processing apparatus according to claim 14, wherein the frequency modulation circuitry performs quadrature phase shift modulation to a phase of the carrier signal by performing the frequency modulation to the carrier signal on the basis of the control data.

23. The signal processing apparatus according to claim 14, wherein the frequency modulation circuitry performs the frequency modulation to the carrier signal using a fractional PLL in which the frequency modulation is performed by demodulating a division ratio used when an oscillation signal is divided and phase comparison is performed in a PLL.

24. The signal processing apparatus according to claim 14, further comprising:
a Gaussian waveform generation circuitry configured to generate a Gaussian waveform according to the control data generated by the controller, wherein
the frequency modulation circuitry performs the frequency modulation to the carrier signal using the Gaussian waveform generated by the Gaussian waveform generation circuitry.

25. A signal processing apparatus, comprising:
a controller configured to generate control data based on an edge at which a value of a digital data to be transmitted is changed, wherein the control data is used for controlling frequency modulation to a carrier signal,
frequency modulation circuitry configured to perform the frequency modulation to the carrier signal on the basis of the control data generated by the controller; and
transmission circuitry configured to transmit, as a transmission signal, the carrier signal to which the frequency modulation is performed by the frequency modulation circuitry,
wherein the controller is configured to perform edge detection that detects the edge at which the value of the digital data is changed, and edge data generation that generates as the control data, edge data indicating a position of the edge detected by the edge detection at a time interval shorter than a time interval of the edge in the digital data, wherein the edge data generation generates the edge data indicating the position of the edge by a pulse, and the controller is configured to perform polarity adjustment that adjusts a polarity of the pulse in the edge data generated by the edge data generation such that a rate of each polarity is equal.

26. The signal processing apparatus according to claim 25, wherein the edge data generation generates the edge data indicating the position of the edge by a pulse having a positive polarity, and the polarity adjustment converts, by alternately inverting the polarity of the pulse in the edge data generated by the edge data generation, the pulse having the positive polarity into a pulse having a negative polarity.

* * * * *